(12) United States Patent
Johnson

(10) Patent No.: US 10,724,723 B2
(45) Date of Patent: Jul. 28, 2020

(54) SENSOR ARRANGEMENTS

(71) Applicant: GOOEE Limited, St Albans (GB)

(72) Inventor: Andrew Johnson, St Albans (GB)

(73) Assignee: GOOEE Limited, London (GB)

( * ) Notice: Subject to any disclaimer, the term of this patent is extended or adjusted under 35 U.S.C. 154(b) by 625 days.

(21) Appl. No.: 14/719,384

(22) Filed: May 22, 2015

(65) Prior Publication Data
US 2015/0338077 A1 Nov. 26, 2015

(30) Foreign Application Priority Data

| May 22, 2014 | (GB) | 1409151.6 |
| Sep. 8, 2014 | (GB) | 1415871.1 |
| Sep. 18, 2014 | (GB) | 1416540.1 |
| Dec. 11, 2014 | (GB) | 1422057.8 |
| Feb. 13, 2015 | (GB) | 1502507.5 |

(51) Int. Cl.
| F21V 23/04 | (2006.01) |
| F21V 5/04 | (2006.01) |
| F21V 23/00 | (2015.01) |
| F21V 23/06 | (2006.01) |
| H05B 45/00 | (2020.01) |
| H05B 47/19 | (2020.01) |
| H05B 47/105 | (2020.01) |
| F21S 8/02 | (2006.01) |

(52) U.S. Cl.
CPC .......... *F21V 23/0442* (2013.01); *F21V 5/048* (2013.01); *F21V 23/005* (2013.01); *F21V 23/045* (2013.01); *F21V 23/0435* (2013.01); *F21V 23/06* (2013.01); *H05B 45/00* (2020.01); *H05B 47/105* (2020.01); *H05B 47/19* (2020.01); *F21S 8/026* (2013.01)

(58) Field of Classification Search
CPC .... F21V 23/0442; F21V 5/048; F21V 23/005; F21V 23/0435; F21V 23/045; F21V 23/06; F21S 8/026; H05B 33/0803; H05B 37/0227; H05B 37/0272
USPC ....... 315/34, 185 R, 291, 308, 312; 362/227, 362/543–545, 800
See application file for complete search history.

(56) References Cited

U.S. PATENT DOCUMENTS

| 7,413,322 B2 | 8/2008 | McCarthy |
| 7,649,472 B1 | 1/2010 | Paterno |

(Continued)

FOREIGN PATENT DOCUMENTS

| EP | 916893 | 5/1999 |
| WO | 2012064906 | 5/2012 |

(Continued)

*Primary Examiner* — Jimmy T Vu

(57) ABSTRACT

A luminaire component for use in a luminaire, said component comprising:—
(i) an LED module on a first printed circuit board (PCB), the first PCB having a front face on which the LED module is located;
(ii) a second PCB mounted forward of the front face of the first PCB;
(iii) connection means adapted to connect the second PCB to the first PCB.

The invention also extends to a luminaire bezel containing one or more sensors, where the bezel is removably attachable to the luminaire. The sensor(s) can measure one or more environmental characteristics and electrical and signal contacts between the bezel and the luminaire are provided. Preferably the electrical and signal contact means is cable-less.

25 Claims, 16 Drawing Sheets

(56) References Cited

U.S. PATENT DOCUMENTS

| | | | |
|---|---|---|---|
| 7,758,234 B1 * | 7/2010 | Savicki, Jr. | H01R 13/652 |
| | | | 362/641 |
| 7,939,837 B2 | 5/2011 | Lynch et al. | |
| 8,042,961 B2 * | 10/2011 | Massara | F21V 23/0471 |
| | | | 362/249.02 |
| 8,292,462 B2 | 10/2012 | Huang | |
| 8,641,241 B2 | 2/2014 | Farmer | |
| 2008/0302929 A1 | 12/2008 | Laso et al. | |
| 2010/0214798 A1 * | 8/2010 | Salter | B60R 13/02 |
| | | | 362/520 |
| 2010/0315247 A1 | 12/2010 | Tseng | |
| 2010/0327766 A1 * | 12/2010 | Recker | H02J 7/025 |
| | | | 315/291 |
| 2013/0049591 A1 | 2/2013 | Quercia et al. | |
| 2015/0142143 A1 * | 5/2015 | Cobbett | G06F 1/163 |
| | | | 700/91 |
| 2015/0289349 A1 * | 10/2015 | Kim | F21K 9/23 |
| | | | 315/34 |

FOREIGN PATENT DOCUMENTS

| | | |
|---|---|---|
| WO | 2012177113 | 12/2012 |
| WO | 2013090536 | 6/2013 |

* cited by examiner

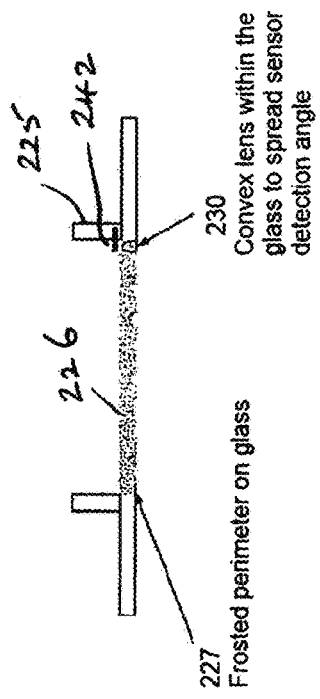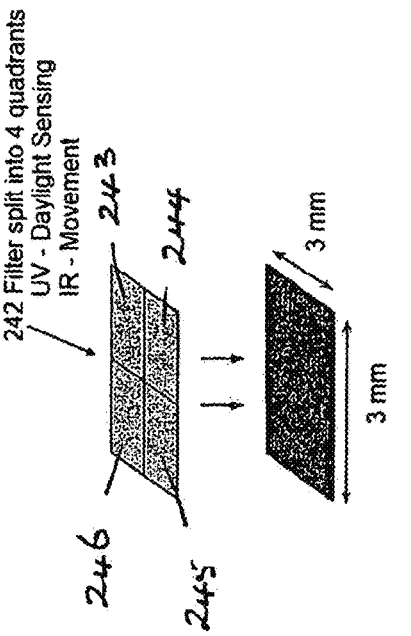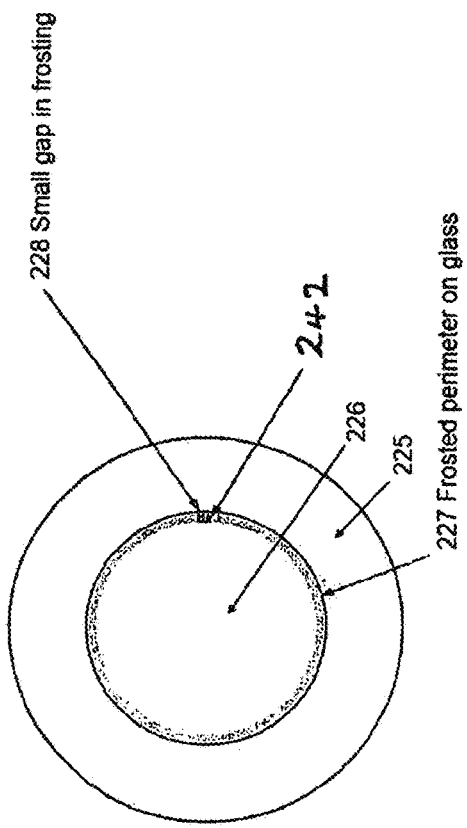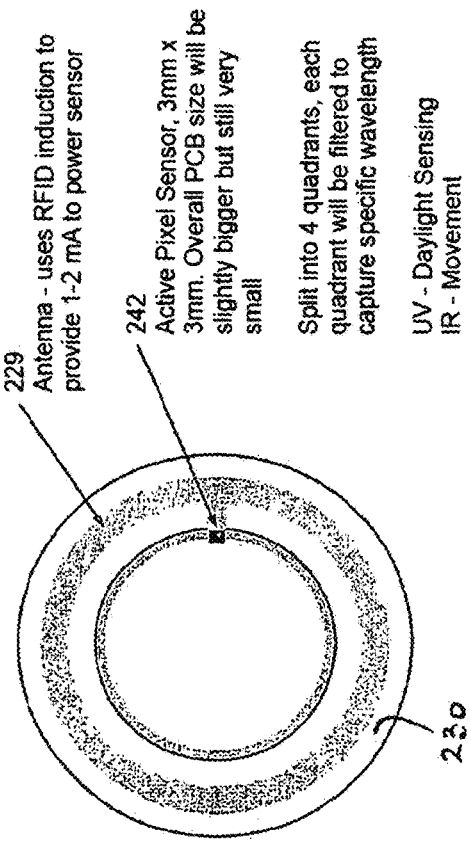

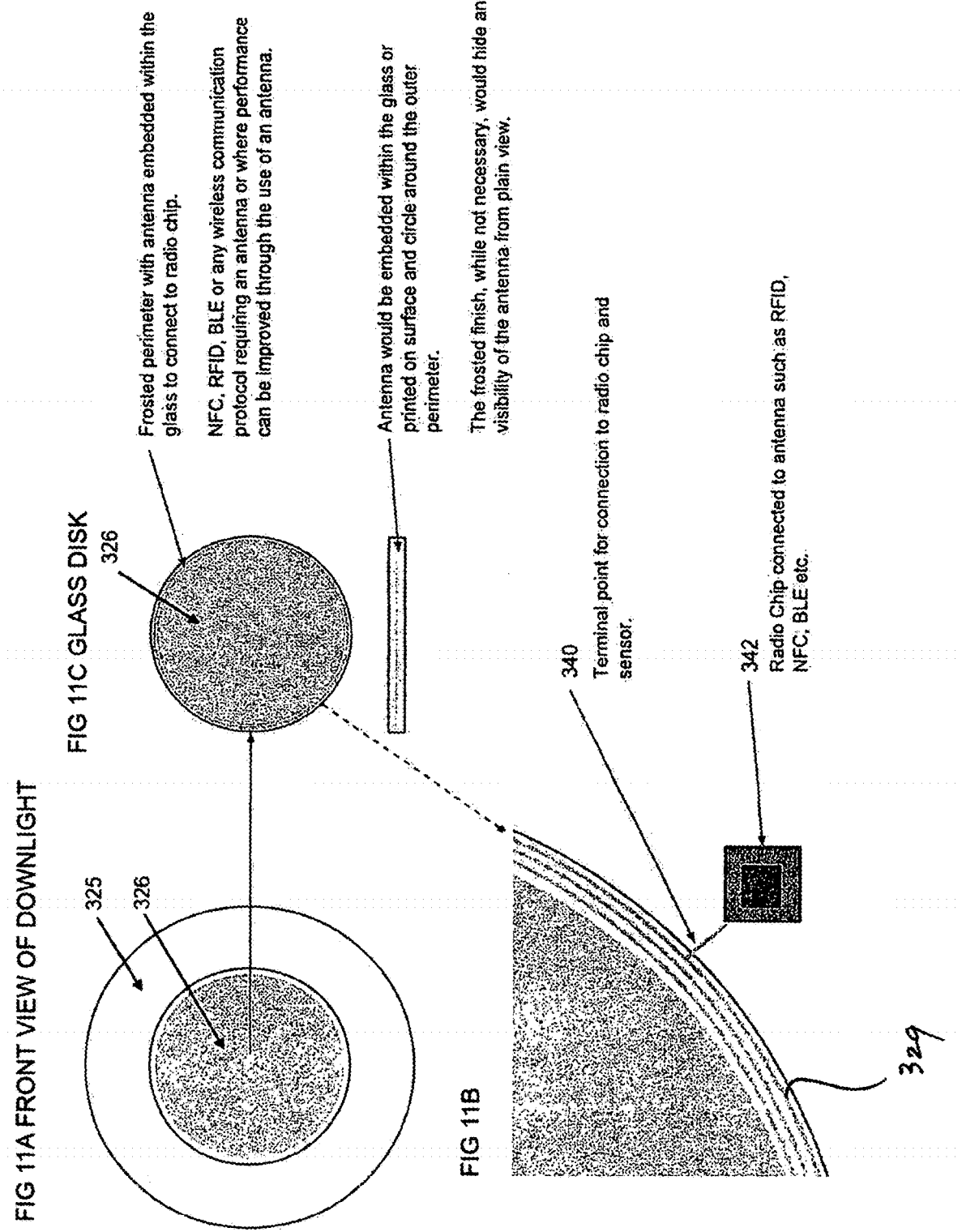

FIG 12A SIDE VIEW OF LEDCHROIC LENS   FIG 12C FRONT VIEW OF LEDCHROIC LENS

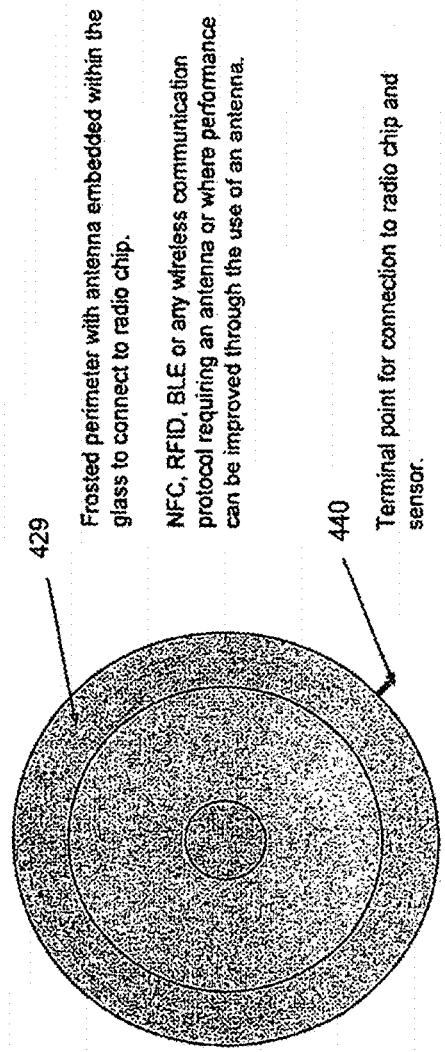

429 — Frosted perimeter with antenna embedded within the glass to connect to radio chip.

NFC, RFID, BLE or any wireless communication protocol requiring an antenna or where performance can be improved through the use of an antenna.

440 — Terminal point for connection to radio chip and sensor.

Antenna would be embedded within the glass and circle around the outer perimeter.

The frosted finish, while not necessary, would hide any visibility of the antenna from plain view.

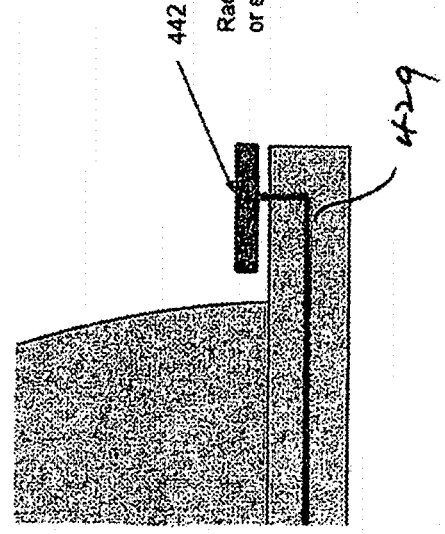

442 — Radio chip either mounted on top side of outer rim or embedded within the lens.

FIG 12B

FIG 14 BULB
(can be placed in Fire Rated Can, or floor/desk lamp

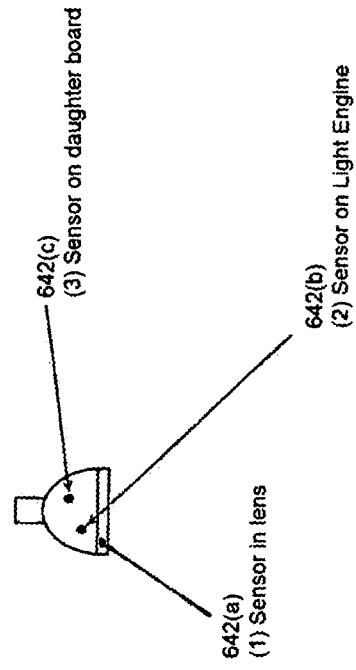

642(c)
(3) Sensor on daughter board

642(b)
(2) Sensor on Light Engine

642(a)
(1) Sensor in lens

Bulb in ceiling downlight can or within floor-standing/desk lamp, containing embedded radio chip for sensing:
- RFID
- NFC
- BLE Sensor will be located within 2 possible locations (as per diagram)

1) In the lens
2) Directly on the light engine
3) On a daughter board (located alongside/above Light Engine)

MR16, GU10, PAR20, PAR30, PAR38, AR111, GLS, LED tubes

FIG 13 INTEGRATED DOWNLIGHT or TRACK LIGHT

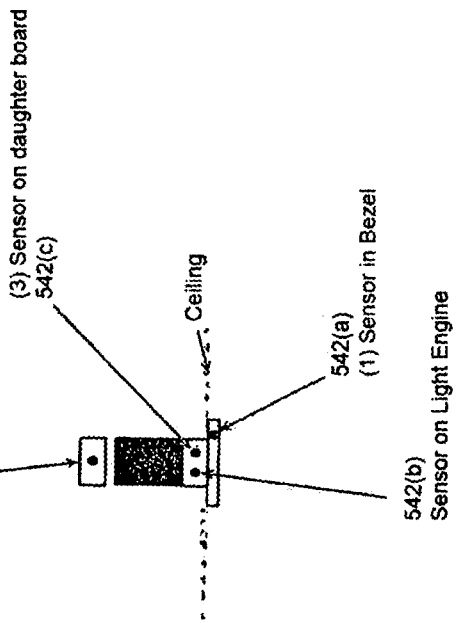

(4) Sensor in Modular Device
542(d)

(3) Sensor on daughter board
542(c)

Ceiling

542(a)
(1) Sensor in Bezel

542(b)
Sensor on Light Engine

Integrated downlight in ceiling, containing embedded radio chip for sensing:
- RFID
- NFC
- BLE Sensor will be located within 4 possible locations (as per diagram):

1) On the bezel
2) Directly on the light engine
3) On a daughter board (located alongside/above Light Engine)
4) Modular device attached within insulation guard Figure 15
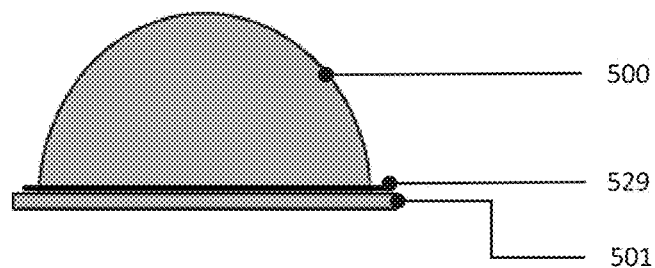
Figure 15A
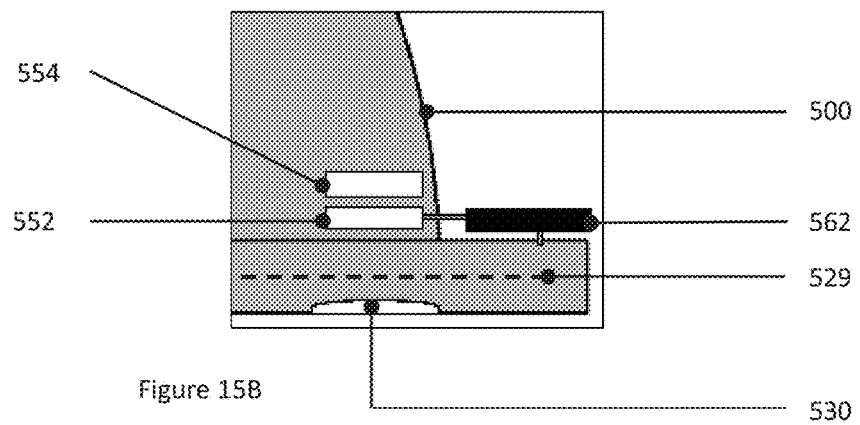
Figure 15B
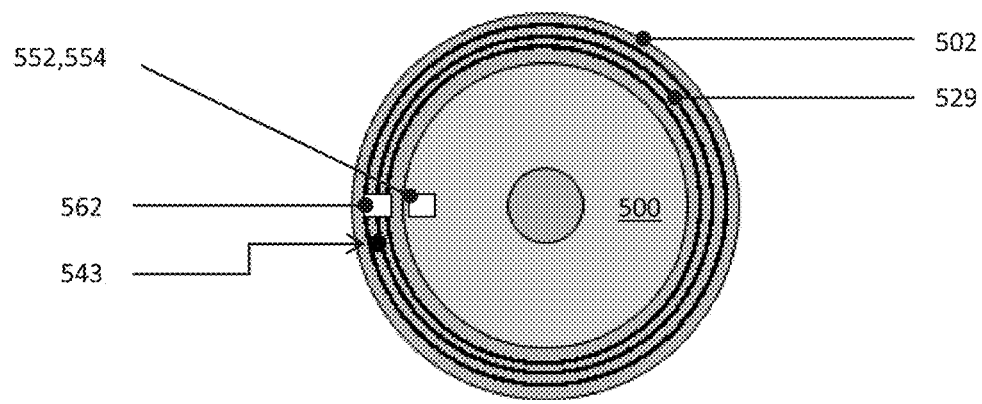
Figure 15C

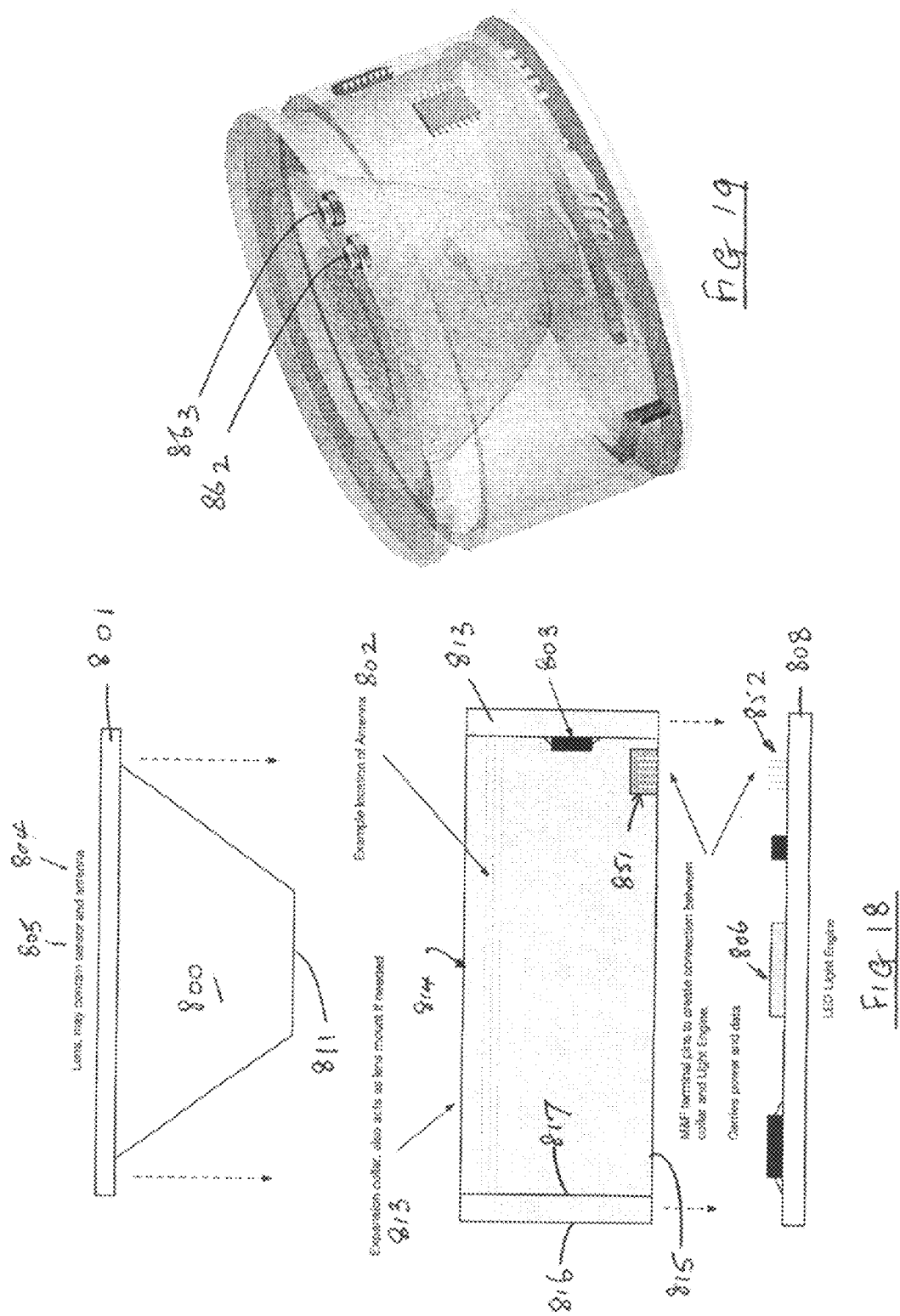

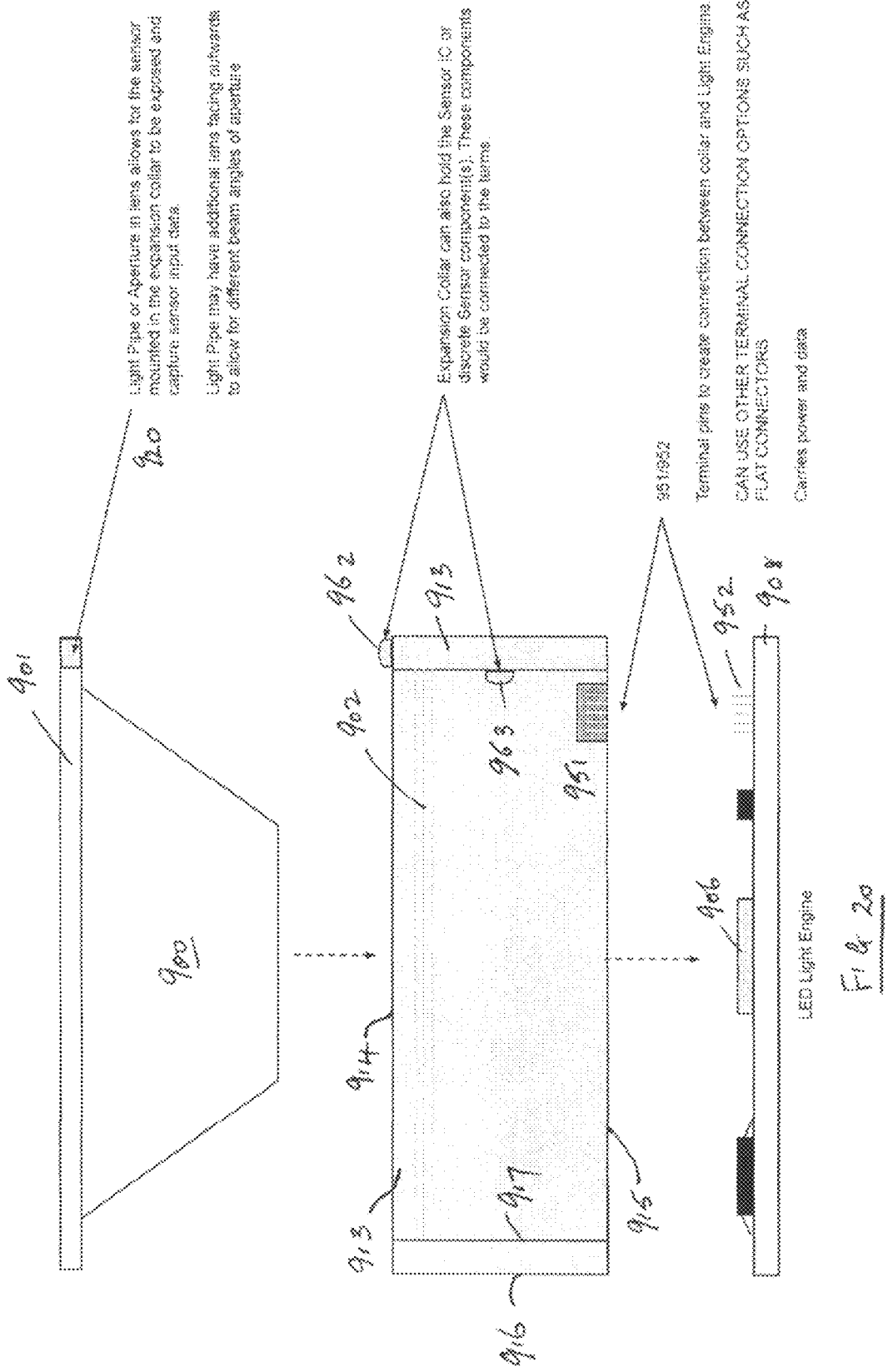

SENSOR ARRANGEMENTS

CROSS-REFERENCE TO RELATED APPLICATIONS

This application claims the benefit of U.K. Patent Application Nos. GB1409151.6 filed May 22, 2014; GB1415871.1 filed Sep. 8, 2014; GB1416540.1 filed Sep. 18, 2014; GB1422057.8 filed Dec. 11, 2014 and GB1502507.5 filed Feb. 13, 2015.

BACKGROUND OF THE INVENTION

The present invention is related to smart luminaires, and more specifically, approaches for incorporating sensors into various luminaire components and complete luminaires, and for communicating data from those sensors with local and distributed networks.

Luminaires or light fixtures which include or are connected to a motion sensor are known, and these are particularly useful for causing a lamp in the luminaire to illuminate when a person is present. This is a convenient way of saving energy when an area is unoccupied, for eliminating light switches inside buildings, and for lighting pathways etc outside at night.

A similar approach has also been developed for thermostats which include or are connected to a motion sensor or light sensor. These collect data on the day length, habitation status and energy usage.

Intruder alarm systems which utilise sensors of various types are also known. The sensors include PIR detectors, pressure switches, and switches that detect opening of doors and windows. Each of these sensors has a specific function and they are connected to an alarm controller.

In addition, a number of devices for the smart home are available which can be controlled and these include thermostats, hazard-detection units, entryway-interface devices, smart switches, including smart wall switches, smart utilities interfaces and other services interfaces, such as smart wall-plug interfaces, and a wide variety of intelligent, multi-sensing, network-connected appliances, including refrigerators, televisions, washers, dryers, lights, audio systems, intercom systems, mechanical actuators, wall air conditioners, pool-heating units, irrigation systems, and many other types of intelligent appliances and systems. These can be controlled remotely from a smart phone, but require a dedicated sensor for each function, or an adapted device such as a thermostat fitted with a PIR or light sensor. However, a house will generally have only one thermostat, and a larger office building may have one thermostat for each floor or office area. This means that data gathered by the thermostat is limited to the immediate environment of its location.

Currently a sensor, such as a motion detection sensor, needs to be on a room-facing surface of a luminaire in order to be able to detect activity in the neighbourhood or environment of the luminaire. This poses a problem for providing power to the sensor and obtaining data from the sensor, particularly where the light fitting needs to be IP (Ingress Protection) rated or fire rated. It also means that the sensor or sensors are highly visible on an outer surface of the luminaire, leading to a poor aesthetic appearance and presents difficulties for decoration and cleaning.

BRIEF SUMMARY OF THE INVENTION

This invention relates to a 'smart' luminaire components and complete 'smart' luminaires that contains detectors that sense information about their local environment and which communicate this information to a processor. These new luminaires offer a way of collecting data about the environment in which they are situated. This overcomes the problems associated with a dedicated sensor in a particular location, such as a thermostat which only covers a limited area, because a building or house will contain many luminaires of different types, each capable of gathering data. The data gathered by the luminaires of this invention thus has a much higher granularity than data collected by other approaches, and is therefore more useful. The use of near-field communication (NFC) or radio frequency identification (RFID) protocols and similar communication protocols such as Bluetooth® or Bluetooth LE between the sensor arrangement and the luminaire leads to improved designs which are simpler and less expensive to manufacture.

According to a first aspect of the present invention there is provided a luminaire component for use in a luminaire, said component comprising: (i) an LED module on a first printed circuit board (PCB), the first PCB having a front face on which the LED module is located; (ii) a second PCB mounted forward of the front face of the first PCB; and (iii) connection means adapted to connect the second PCB to the first PCB.

By providing a second PCB mounted in front of and preferably away from the first LED carrying PCB, it is possible for the first time to introduce new functionality into a luminaire, such as by incorporating one or more data communication devices onto the second PCB.

Preferably the data communication device comprise a wireless communication device.

Preferably the luminaire component further comprises a sensor arrangement incorporating one or more sensors.

Preferably the luminaire component further comprising an optical system/lens for focusing light emitted by the LED module. There are a number of optical systems that can be used to focus light from an LED and typically current LED luminaires use lenses.

Preferably the luminaire component further comprises one or more antennae.

Preferably the sensor arrangement is located on or associated with the lens and more preferably on or in an outwardly extending flange of the lens.

In a particularly preferred embodiment the luminaire component further comprises a collar. In this context the term collar has a very broad meaning and it need not be substantially circular or continuous in its shape and conformation. Preferably the collar supports the second PCB and is also preferred that the sensor arrangement is located on or associated with the collar.

Preferably the sensor arrangement is located on or associated with an outer edge of the collar, and therefore furthest from the LED module.

Preferably the collar further comprises a transmitter assembly suitable for transmitting data obtained by the sensor arrangement. Preferably the collar also supports the lens.

Preferably the luminaire component further comprises a second connection means adapted to connect the sensor arrangement to the second PCB. By directly connecting the sensor arrangement to the second PCB the sensor arrangement can be supplied with power and deliver data it collects without the need for wireless communication, although wireless or power line communication may be necessary to transmit that data away from the luminaire component and thus from the luminaire.

Preferably the luminaire component incorporates and one or more antennae. Preferably one antenna comprises a first antenna suitable for creating a magnetic or electrical field suitable for powering the sensor arrangement, and preferably one antenna comprises a second antenna suitable for converting the magnetic or electrical field from the first antenna into electrical power for powering the sensor arrangement. These antennae can be located in any suitable location. For example, one antenna may be located on or associated with the collar and a second antenna may be located on or associated with the lens flange.

Preferably the second PCB comprises a flexible PCB and more preferably an adhesive flexible PCB.

Preferably the connection means provides a power connection and/or a data connection between the first PCB and the second PCB. These connection means can take a wide variety of forms, as determined by the appropriate design expert. For example the connection means could comprise a plurality of male and female pin connectors, or comprise one or more electrical contact points on or associated with the second PCB which are brought into contact with corresponding electrical contact points on the first PBC.

Preferably the luminaire component further comprising a receiver suitable for receiving data from the sensor arrangement and/or a transmitter suitable for transmitting data obtained by the sensor arrangement.

It will be understood that the present invention also extends to include luminaires incorporating a luminaire component as described above.

According to a further aspect of the present invention there is provided a luminaire component. For example there is provided a luminaire component suitable for use in a luminaire, said component comprising: (i) a sensor arrangement incorporating one or more sensors; (ii) a first antenna suitable for creating a magnetic or electrical field; (iii) a second antenna suitable for converting a received signal from the first antenna into electrical power for powering the sensor arrangement; (iv) a transmitter suitable for transmitting data obtained by the sensor arrangement; and (v) a receiver suitable for receiving data from the sensor arrangement.

In this context the term 'luminaire component' has a broad meaning and refers to any component, or combination of components, suitable for incorporation into any form of luminaire. By using a wireless means of powering the sensors in the sensor arrangement, such as NFC or RFID protocols or the like, and a wireless method of sending data from the sensor(s) to a receiver/reader and/or processor in the luminaire, it is possible to avoid a wired connection between the sensor arrangement and the control circuitry associated with the luminaire. This makes it possible to produce IP rated fittings including a range of sensor technologies for the first time by incorporating a seal between the portion containing the sensor and the rest of the luminaire.

Preferably, the luminaire component comprises a bezel and wherein the sensor arrangement is located at or near a face of the bezel.

Preferably, the bezel further incorporates the second antenna.

Preferably, the second antenna comprises a series of loops around the bezel.

Preferably, the second antenna is located on a surface of the bezel which, in use, faces toward the light fitting and is thus internal to the luminaire.

Preferably, the second antenna is printed on a surface of the bezel itself.

Preferably, the bezel further includes a substantially transparent element through which light from the luminaire is emitted, and wherein the sensor arrangement is located on or associated with the transparent element.

Preferably, the second antenna is associated with the transparent element of the bezel.

Preferably, the second antenna is printed on the transparent element.

Preferably, the second antenna is embedded in the transparent element.

Preferably, the second antenna is substantially the same shape as the transparent element.

Preferably, the transparent element has a frosted perimeter, and wherein the second antenna is located behind or within the frosted perimeter.

Preferably, the sensor arrangement is located behind a gap in the frosted perimeter of the substantially transparent element of the bezel.

Preferably, the transparent element includes a convex lens in front of the sensor arrangement in order to spread the sensor detection angle.

Preferably, the luminaire component comprises a lens adapted to focus light emitted from a light source, and wherein the sensor arrangement is located on or associated with the lens.

Preferably, the lens further incorporates the second antenna.

Preferably, the second antenna comprises a series of loops around the perimeter of the lens.

Preferably, the second antenna is located on a surface of the lens which, in use, faces toward the light fitting and is thus internal to the luminaire.

Preferably, the second antenna is printed on the lens.

Preferably, the lens is substantially frustoconical in cross-section with an outwardly extending flange around the perimeter of the front of the lens.

Preferably, the second antenna is located substantially on or associated with the lens flange.

Preferably, the second antenna is printed on a surface of the lens flange.

Preferably, the lens flange has a frosted perimeter, and wherein the antenna is located behind the frosted perimeter.

Preferably, the sensor arrangement is located behind a substantially transparent gap in the frosted perimeter of the lens flange.

Preferably, the transparent element in the flange includes a convex lens in front of the sensor arrangement in order to spread the sensor detection angle.

Preferably, the first antenna and the second antenna communicate via electromagnetic, electrostatic, magnetic or inductive coupling.

Preferably, the transmitter and the receiver communicate via electromagnetic, electrostatic, magnetic or inductive coupling.

Preferably, the transmitter and the second antenna communicate via wireless communication.

Preferably, the sensor arrangement detects wireless signals.

Preferably, the wireless signal protocol is selected from the group of protocols comprising NFC, RFID and low energy Bluetooth® protocol signals.

Preferably, the first antenna and the receiver are integrated into a transceiver.

Preferably, the sensor arrangement comprises:

(i) a first sensor array facing substantially away from the luminaire for detecting information about the environment of the luminaire; and (ii) a second sensor array facing substantially toward a light source in the luminaire for detecting information about the operation of the light source.

Preferably, the second sensor array detects a luminous flux of light emitted by the luminaire.

Preferably, the second sensor array detects the colour temperature of light emitted by the luminaire.

Preferably, the first and the second sensor arrays are integrated.

Preferably, the transmitter is integrated with the first and/or second sensor arrays.

Preferably, the component further comprises a light engine.

Preferably, the first antenna and the receiver are located on or associated with the light engine.

Also provided is a luminaire incorporating a luminaire component according to any of the above.

Preferably, the luminaire comprises a lamp.

Preferably, the luminaire comprises a downlight.

Also provided is a bezel for a luminaire, the bezel comprising: fixing means for removable attachment to the luminaire; one or more sensors for an environmental characteristic; and electrical contact means between the bezel and the luminaire.

Preferably, the fixing means comprises a screw thread rotatably engageable with a corresponding screw thread on the luminaire.

Preferably, the fixing means comprises a push fit connection.

Preferably, the fixing means comprises a bayonet-type twist and lock connection.

Preferably, the electrical contact means comprise one or more electrical contact points which are brought into contact with corresponding electrical contact points on the luminaire as the bezel is attached to the luminaire.

Preferably, the one or more electrical contact points are insulated from each other and from the bezel.

Preferably, the bezel further comprises a processor for analysing a signal received from the sensor and for providing data about the environmental characteristic, the processor receiving electrical power from the luminaire via the electrical contact means.

Preferably, the processor provides data about the environmental characteristic to the luminaire.

Preferably, the processor provides data about the environmental characteristic to an environmental controller.

Preferably, the sensor includes one or more from the group of sensors comprising: proximity sensors, including capacitive, capacitive-displacement, conductive, magnetic, optical, thermal, and sonar; motion sensors, including passive infrared ("PIR") motion detectors, ultrasonic, microwave, and tomographic motion detectors; acoustic sensors including microphones; charge-coupled detectors; low-resolution digital cameras; thermopiles; thermocouples; carbon dioxide sensors; water-vapour detectors; flow meters; pressure sensors, field-strength sensors for magnetic and electrical fields.

Preferably, the environmental characteristic includes; changes in temperatures, gasses exhaled by human beings and other living creatures; types of sounds or sound patterns; changes in ambient light due to moving objects; changes in pressure within an environment due to opening and closing of doors, windows, or motion of large objects through the air; and other such pressure changes; rate of flow of water, natural gas, and other gasses; temporal changes in field strength.

Also provided is a luminaire comprising: a fitting for a lamp; a bezel as disclosed above; a processor electrically connected to the sensor; and a controller connected to the processor; wherein the processor analyses a signal received from the sensor and provides data about the environmental characteristic to an environmental controller, wherein the environmental controller controls electrical current provided to the fitting.

Also provided is a luminaire comprising: a fitting for a lamp; a bezel as disclosed above; wherein the luminaire provides data about the environmental characteristic to an environmental controller, wherein the environmental controller controls electrical current provided to the fitting.

Also provided is a luminaire comprising: a fitting for a lamp; a bezel as disclosed above; wherein the environmental controller controls electrical current provided to the fitting.

Preferably, the environmental controller is integral to the luminaire.

Preferably, the luminaire is a downlight.

Preferably, the sensor includes: proximity sensors, including capacitive, capacitive-displacement, conductive, magnetic, optical, thermal, and sonar; motion sensors, including passive infrared ("PIR") motion detectors, ultrasonic, microwave, and tomographic motion detectors; acoustic sensors including microphones; charge-coupled detectors; low-resolution digital cameras; thermopiles; thermocouples; carbon dioxide sensors; water-vapour detectors; flow meters; pressure sensors, field-strength sensors for magnetic and electrical fields.

Preferably, the environmental characteristic includes; changes in temperatures, gasses exhaled by human beings and other living creatures; types of sounds or sound patterns; changes in ambient light due to moving objects; changes in pressure within an environment due to opening and closing of doors, windows, or motion of large objects through the air; and other such pressure changes; rate of flow of water, natural gas, and other gasses; temporal changes in field strength.

Preferably, the lamp includes a LED lamp, a LED light engine, a compact fluorescent lamp, a fluorescent lamp, a halogen lamp, or a high intensity discharge lamp.

Preferably, the LED light engine comprises a LED module and a LED driver.

Preferably, the LED module comprises one or more LEDs.

Also provided is a luminaire comprising: a fitting for a lamp; one or more sensors for an environmental characteristic; a processor electrically connected to the sensor; and a controller connected to the processor; wherein the processor analyses a signal received from the sensor and provides data about the environmental characteristic to a controller, wherein the environmental controller controls electrical current provided to the fitting.

Accordingly, the present invention is directed toward a luminaire component which includes a sensor or sensors, a processor or processors for processing data from the sensor, and an environmental controller. The environmental controller is connected to further equipment for actuation.

The data collected may be collected and stored, or it may processed to control how a luminaire or a lamp in a lighting fixture operates, to monitor the status of the luminaire/lamp or it can be processed to control other remote equipment.

A smart-home environment may include a number of intelligent, multi-sensing, network-connected devices. These smart-home devices intercommunicate and are integrated together within the smart-home environment. The smart-home devices may also communicate with cloud-based smart-home control and/or data-processing systems in order to distribute control functionality, to access higher capacity and more reliable computational facilities, and to integrate a particular smart home into a larger, multi-home or geographical smart-home-device-based aggregation.

In general, smart-home devices include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications are generally carried out using any one or combination of a large variety of different types of communications media and protocols, including wireless protocols, such as Wi-Fi, Zig-Bee, 6LoWPAN, Bluetooth and various types of wired protocols, including CAT6 Ethernet, HomePlug and other power line communication (PLC) protocols, and various other types of communications protocols and technologies. Smart-home devices may themselves operate as intermediate communications devices, such as repeaters, for other smart-home devices. The smart-home environment may additionally include a variety of different types of legacy appliances and devices and which lack communications interfaces and processor-based controllers.

Luminaire components of the present invention include components suitable for use in luminaires for indoor use such as bathroom lighting, cabinet and display lighting, commercial lighting, downlighting, emergency lighting, low level lighting, strip, flex and modular lighting, surface lighting, track lighting, uplighting, marker lights, and wall luminaries. These include fire rated downlighting, downlighting, LED flat panels, LED high bays, pendant lights, spotlights, track systems, bulkheads, LED strip, LED signage modules, cabinet lighting, bathroom lighting, emergency lighting, wall lights, low level lighting, recessed ground lighting, suspended lighting, ceiling lights, commercial lighting, lamps, bulbs and indoor luminaire accessories.

Luminaire components of the present invention also include components suitable for use in luminaires for outdoor use such as flexible outdoor lighting options include ceiling/canopy lighting, coastal lighting, floodlighting, low level lighting, pathway lighting, recessed ground lighting, spotlighting, strip, flex and modular lighting, walkover lights, wall lighting, wall washing and grazing solutions. These include: outdoor bulkheads, outdoor wall lights, outdoor LED strip, LED signage modules, pathway lighting, wall washers, floodlighting, outdoor spotlights, submersible & coastal lighting, outdoor low level lighting, outdoor recessed ground lighting, outdoor ceiling/canopy lighting.

It will be appreciated that the present invention extends to cover complete luminaires incorporating components according to the present invention, including the types of luminaires listed above, as well as lamps (bulbs). Lamps of the present invention include LED, CFL, fluorescent, halogen, and HID lamps, including constant current LED drivers, constant voltage LED drivers, transformers, and HID ballasts.

Environmental controllers include those which interact directly with the lighting environment within smart-homes and automated environments. These include RGB lighting controllers, rotary lighting dimmers, lighting scene controllers & specialist lighting controls which maximise energy savings and lighting system safety.

BRIEF DESCRIPTION OF THE SEVERAL VIEWS OF THE DRAWING

The invention will now be described, by way of example only, in relation to the accompanying figures wherein:

FIGS. 10A, 10B, and 10C show front, rear and side views, respectively, of a luminaire bezel; FIG. 10D shows a diagrammatic view of a 4-in-1 sensor arrangement;

FIG. 11A shows a front view of a substantially transparent glass disk in a bezel incorporating an antenna; FIG. 11B shows an enlarged view of a portion of the glass disk; and FIG. 11C shows plan and side views of the glass disk;

FIG. 12A shows a side view of a lens incorporating an antenna; FIG. 12B shows a close up view of a portion of the lens; and FIG. 12C shows a front view of the lens;

FIG. 13 shows a diagrammatic representation of an integrated downlight or track light incorporating sensor technology of the present invention;

FIG. 14 shows a diagrammatic representation of a bulb (lamp) incorporating sensor technology of the present invention;

FIG. 15A shows a side view of a lens incorporating two sensors in a back-to-back configuration; FIG. 15B shows a close up view of a portion of the lens; and FIG. 15C shows a front view of the lens;

FIG. 18 shows in exploded diagrammatic form an LED Light Engine/Module on a first PCB, a collar incorporating a second PCB, and a lens; and FIG. 20 shows a further embodiment in exploded diagrammatic form.

DETAILED DESCRIPTION OF THE INVENTION

Figure 1:
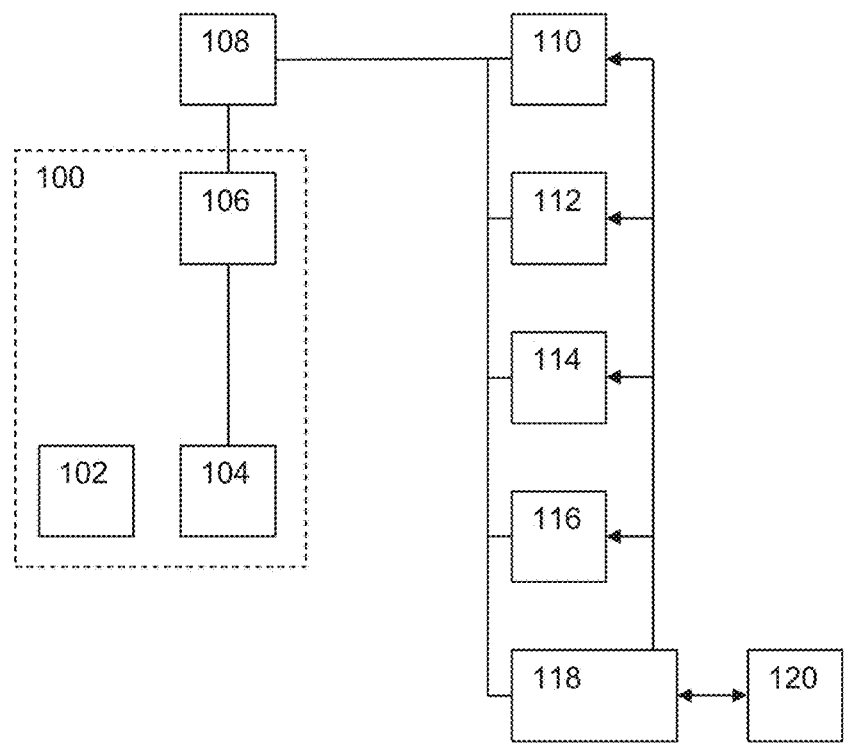
FIG. 1 shows a luminaire 100 of the present invention, comprising a fitting 102 for a lamp and a sensor 104.

FIG. 1 shows a luminaire 100 of the present invention, comprising a fitting 102 for a lamp and a sensor 104. In FIG. 1, these are shown by the dashed lines to be contained within a housing of luminaire 100, but it is to be understood that sensor 104 may be located, at least partially, on the outside of the housing. Fitting 102 can hold any type of device used to emit light, such as an incandescent lamp, fluorescent lamp, light emitting diode, or LED light engine. The term luminaire is to be understood to encompasses similar terms such as light fixture and light fitting. The term lamp is to be understood to encompass similar terms such as light bulb, light or LED light engine. An LED light engine is a combination of one or more LED modules together with the associated electronic control gear or LED driver. An LED module contains one or more LEDs, together with further components, but excludes the control gear.

Sensor 104 includes devices able to sense information about the local environment of luminaire 100, including proximity detectors, passive infrared ("PIR") motion detectors, other types of motion detectors, daylight sensors, microphones or other types of acoustic detectors, charge-coupled detectors ("CCD") or low-resolution digital cameras, ambient temperature sensors, thermopiles or thermocouples, carbon dioxide sensors, water-vapour detectors, pressure sensors, and various types of field-strength sensors that sense magnetic and electrical fields. Proximity detectors include a wide variety of different types of sensors, including capacitive, capacitive-displacement, conductive, magnetic, optical, thermal, sonar, and other types of sensors. PIR motion-detector sensors detect abrupt changes in temperatures based on infrared radiation emitted by living creatures. Other types of motion detectors include ultrasonic, microwave, and tomographic motion detectors. Audio detectors can detect sound and Acoustic detectors can detect various types of sounds or sound patterns indicative of the presence of human beings. Low-resolution cameras and CCD devices may detect changes in ambient light, including changes in ambient light due to moving objects. Thermopiles and thermocouples can be used to detect changes in temperature correlated with the presence of human beings and other living organisms. Similarly, carbon dioxide and water vapour detectors may detect gases exhaled by human beings and other living creatures, and methane detectors may detect gases present in, for example, mine workings. Pressure sensors may detect changes in pressure within an environment due to opening and closing of doors, windows, motion of large objects through the air, and other such pressure changes. Flow meters may detect the rate of flow of water, natural gas, and other gasses and liquids that flow under positive control by human beings. Field-strength sensors may detect temporal changes in field strength correlated with presence of human beings or motion of human beings through an environment.

A processor 106 receives data from sensor 104. Processor 106 processes a signal from sensor 104 according to the phenomenon the sensor is sensing. The term signal in this context is intended to include data. The processing may include collecting and storing data at fixed points in time, averaging the signal over periods of time, or adding additional information such as a time stamp or a location of the luminaire. In FIG. 1, processor 106 is shown integral to luminaire 100, but it is to be understood that processor 106 may be external to luminaire 100. It will be further understood that the necessary processing function can be located at any suitable location inside our outside the luminaire. If located associated with the luminaire it could be on a PCB within the luminaire, such as on an LED MCPCB, or on a separate PCB.

A controller 108 is connected to processor 106. Controller 108 functions to utilize the data provided by processor 106 to control a supply of current to lamp 102 or actuate equipment or devices which are remote from luminaire 100. Examples of external equipment or devices include heating, ventilation, and air conditioning (HVAC) systems 110, smart-home equipment and devices 112, other devices 114 and various different types of local computer systems 116.

Controller 108 can also be connected to data communications 118, including routers, bridges, and hubs within a local smart-home environment, and the Internet. Data communications are generally carried out using any of a large variety of different types of communications media and protocols, including wireless protocols, such as Wi-Fi, Zig-Bee, 6LoWPAN, various types of wired protocols, including CAT6 Ethernet, HomePlug, and other such wired protocols, and various other types of communications protocols and technologies. Smart-home devices may themselves operate as intermediate communications devices, such as repeaters, for other smart-home devices.

This means that the controller 108 can control or actuate external equipment indirectly via data communications 118. It also means that the data can be communicated to external systems 120 such as cloud-computing servers, whereby for example a smart-home device may communicate with cloud-computing servers and other remote computing systems having data provided by luminaire 100 of the present invention. Controller 108 can also analyse the data provided to determine a probability of the presence of one or more types of entities, such as human beings, within a region in the proximity of the luminaire.

Figure 2:
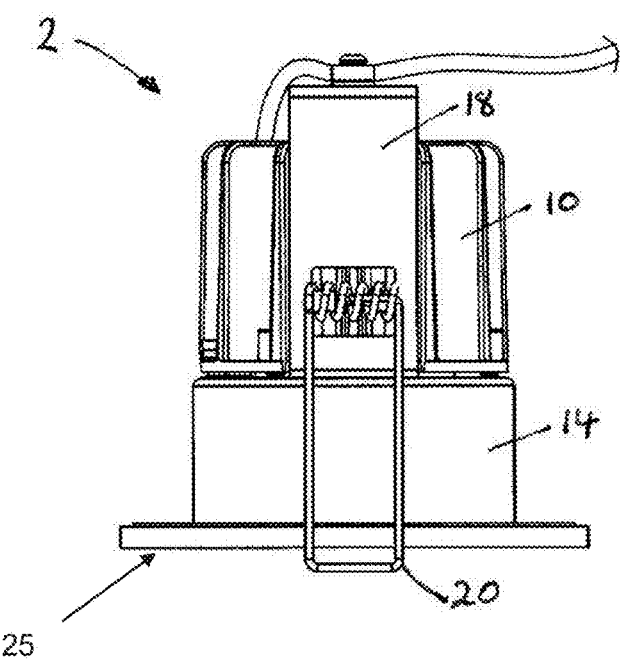
FIG. 2 shows a downlight luminaire.

The invention will now be further described by referring to FIGS. 2 to 7, which show examples of a luminaire in the form of a recess type downlight fitting or downlighter. These kinds of luminaires are almost entirely concealed behind a ceiling or other suitable panel or surface. Referring to FIG. 2, the downlight unit 2 comprises a heat sink 10 connected to a cylindrical casing. The cylindrical casing comprises a mounting ring 14. The mounting ring 14 comprises a side wall having a lower peripheral annular flange 25 extending outwardly from a bottom end of the side wall. A bracket 18, incorporating spring biased members or clips 20, is located about the heat sink 10. The spring biased members or clips 20 are adapted to secure the lighting unit in a recess. The bracket 18 is secured to an upper peripheral flange of the mounting ring 14 in a suitable fashion.

Figure 3:
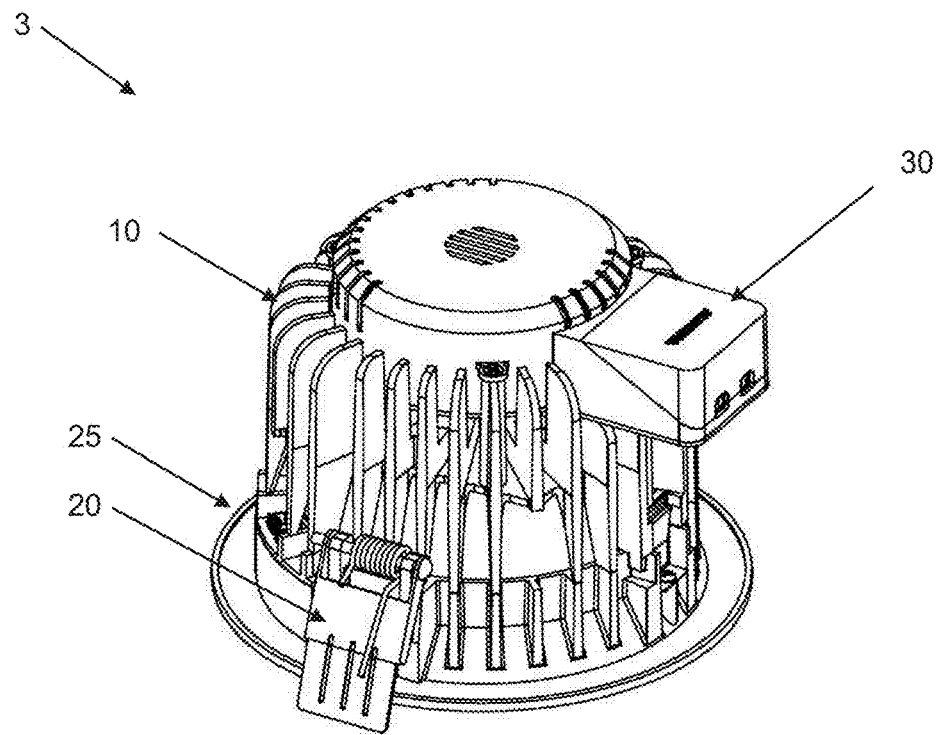
FIGS. 3 and 4 show a side perspective view and a front view respectively of a luminaire having a flange or bezel carrying a sensor.
Figure 4:
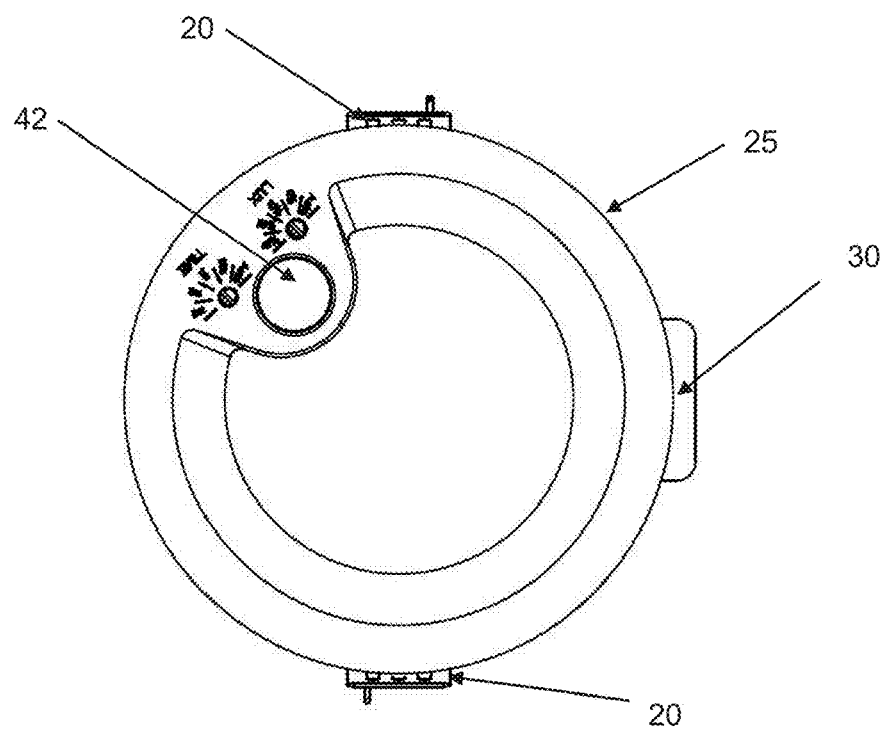

FIGS. 3 and 4 show a downlight fitting or downlighter 3 in which flange 25 is adapted to include a sensor 42,104 which provides a signal to processor/controller 30,106/108. In the example shown 42,104 sensor is a PIR sensor, and the signal from sensor 42,104 is provided to a PIR processor circuit 106, and thence to controller 108. When a person in the proximity of the luminaire is detected by the PIR sensor/processor, the controller causes current to be provided to the lamp.

Figure 5:
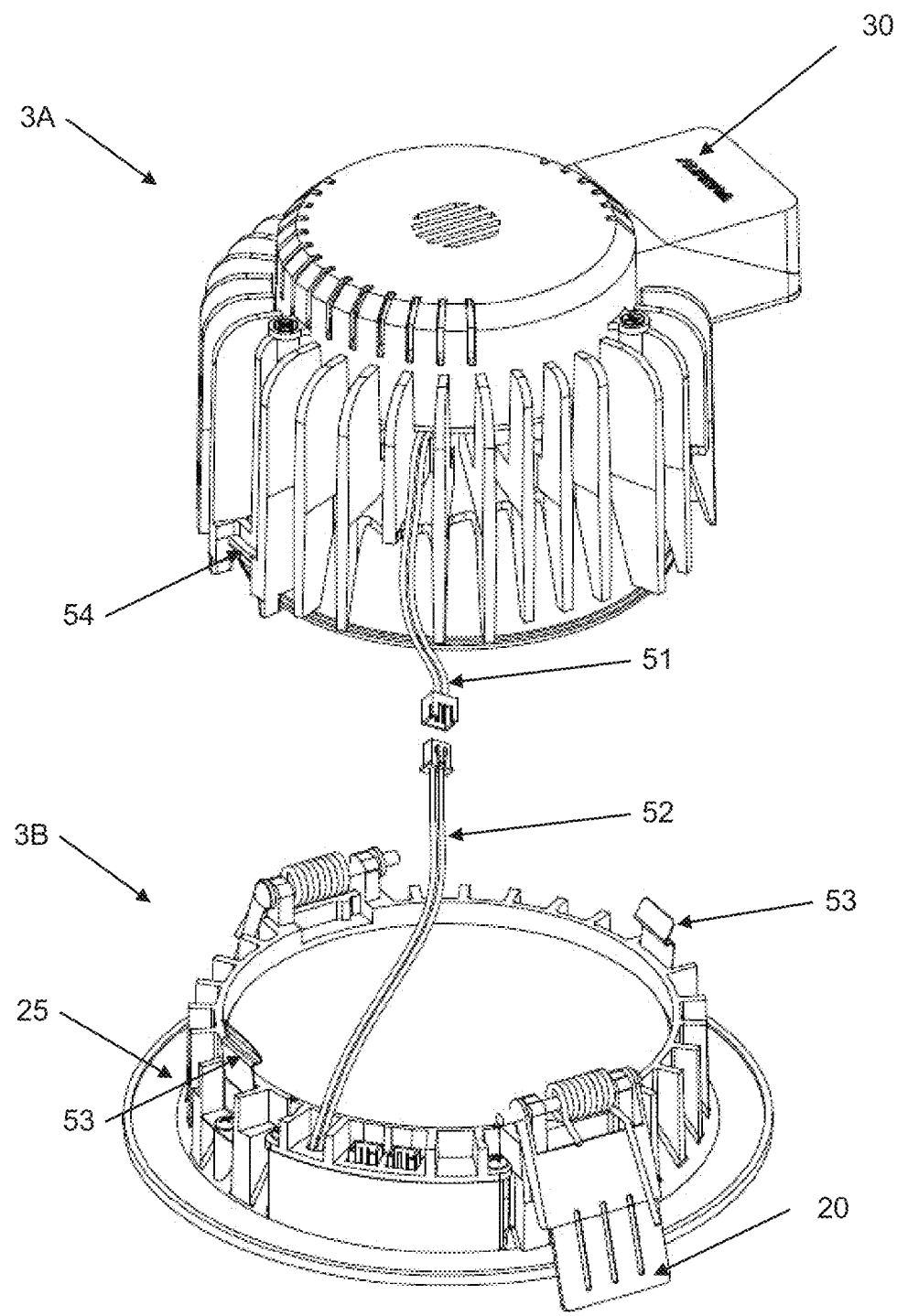
FIG. 5 shows an exploded perspective view of a luminaire having a removable bezel carrying a sensor and a wired connection between the bezel and the body of the luminaire.
Figure 6:
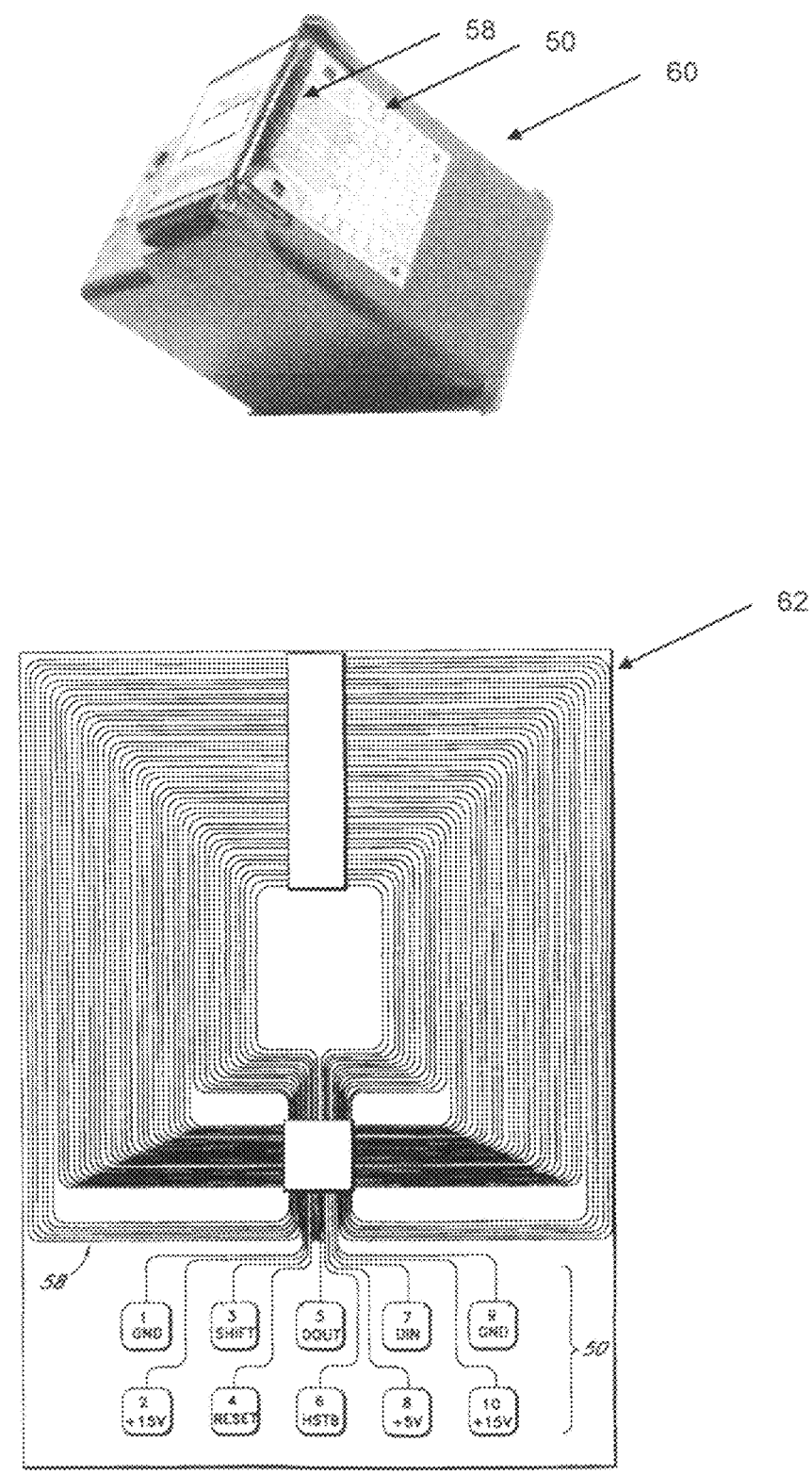
FIG. 6 shows contacts and signal paths of a print cartridge.
Figure 8:
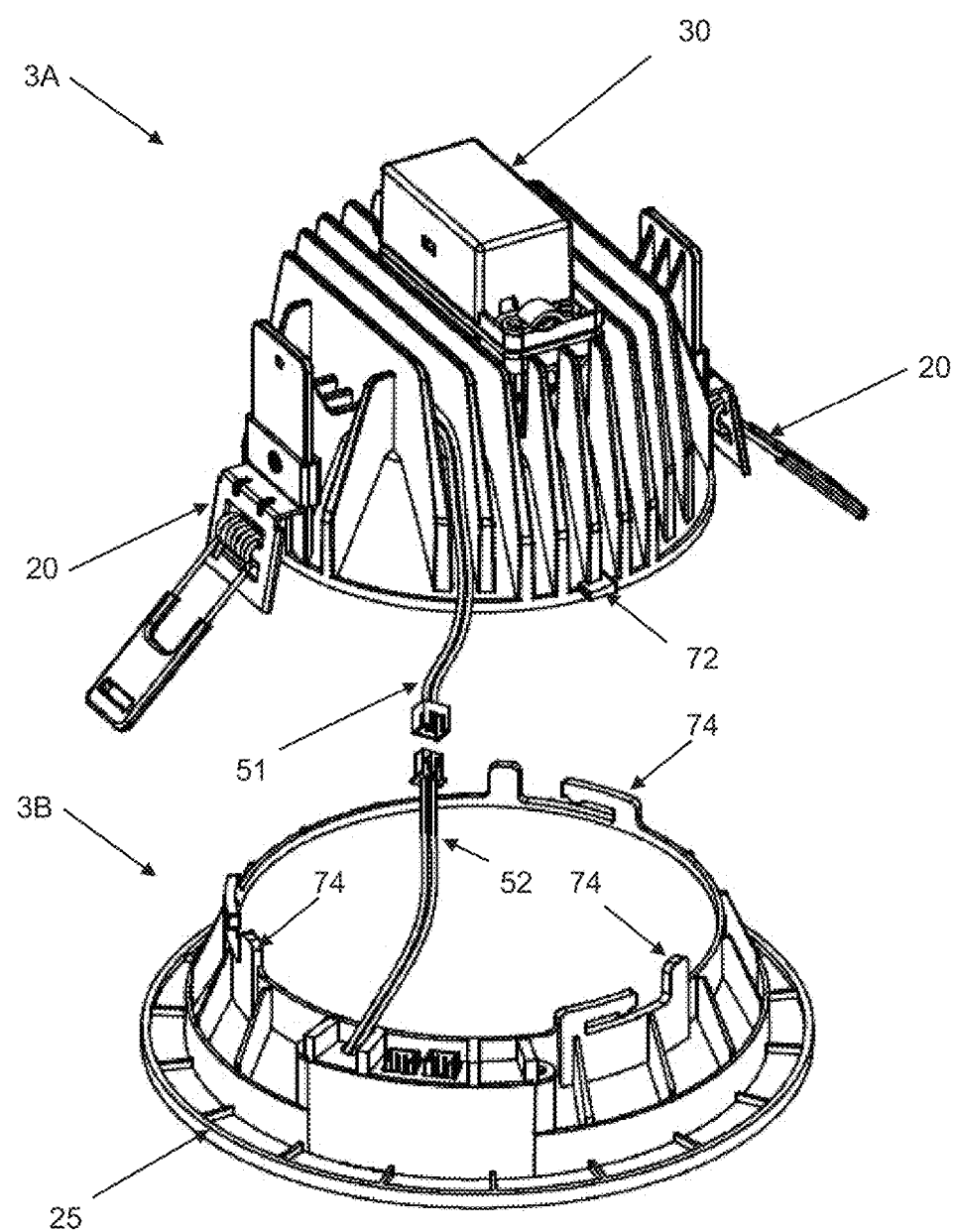
FIG. 8 shows an exploded perspective view of a further luminaire type.

FIG. 5 shows a two part variant of lamp 3 comprising a lamp portion 3A and a bezel portion 3B, the two parts being adapted to be joined, for example by a push fit as shown in which clips 53 engage with recesses 54. Alternative arrangements for joining a bezel to a luminaire are known, such as by means of a screw thread around a periphery of the lower part of luminaire portion 3A and a corresponding screw thread around an inner portion of bezel part 3B. FIG. 8 shows another example of joining these two components comprising a bayonet type twist and lock mechanism having a male side with radially extending pins 72 engaging with a corresponding female receptor with matching L-shaped slots 74. Cable 51 may then be connected to cable 52 to give a luminaire which functions in the same way as luminaire 3 in FIGS. 3 and 4. For a cableless connection, one or more electrical and signal contact points on the bezel are brought into contact with corresponding electrical contact points on the luminaire as the bezel is pushed onto, screwed into, or twist-locked onto the luminaire. These electrical/signal contacts are formed by the two sets of contacts being pushed together under pressure as bezel 3B is fitted to luminaire part 3A, in an analogous way as, for example, the contacts on a print head of a printer engage with the contacts 50 on a surface 62 of a print cartridge 60 of the type shown in FIG. 6 as the cartridge is fitted. FIG. 6 also shows an example of how signals from the print head are conveyed to the print cartridge via contact paths 58. The two-part construction facilitates maintenance and also reduces potential stock-holding by allowing different colours and styles of bezels, with or without sensors as required by the user, to be stocked independently of the light engine and lamp portion. This type of arrangement is discussed in more detail with reference to FIG. 9 below.

Figure 7:
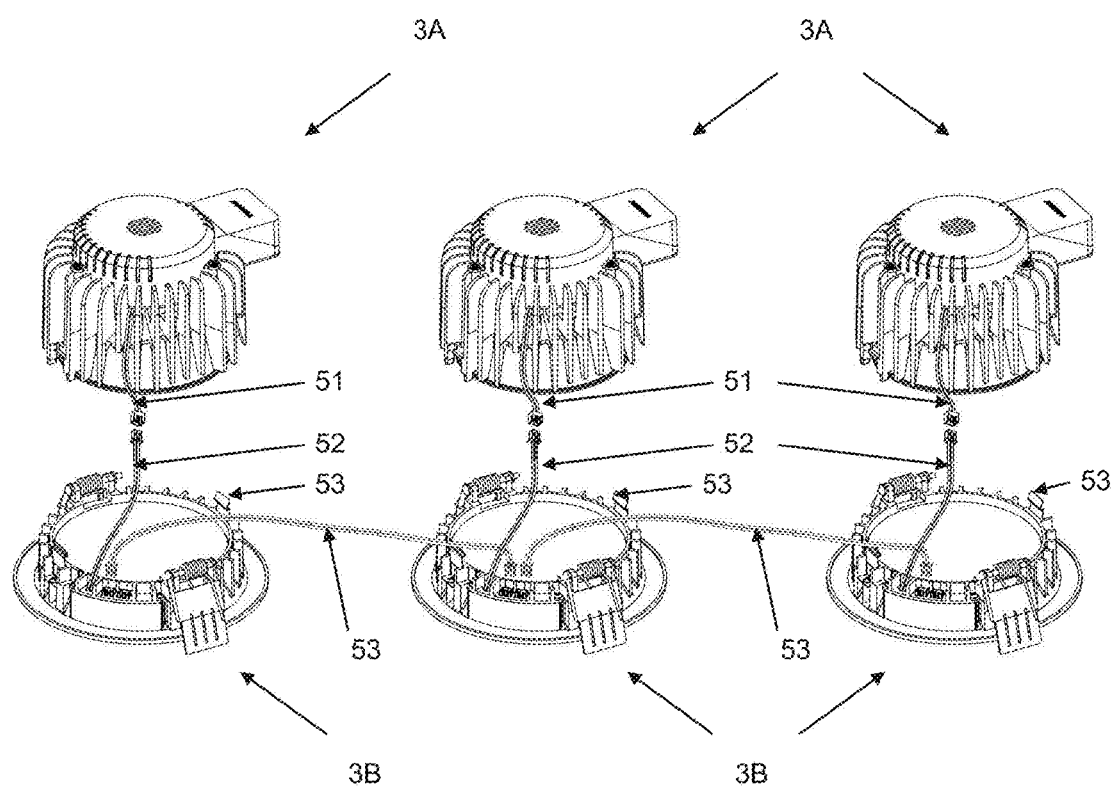
FIG. 7 shows how luminaries of the present invention can be connected in series.

FIG. 7 shows a further variant in which luminaires 3 comprised of lamp portions 3A and bezel portions 3B can be interconnected by a further cable 53. This means that controller 30,108 of one lamp can communicate with a controller 30,110 of another lamp.

Figure 9:
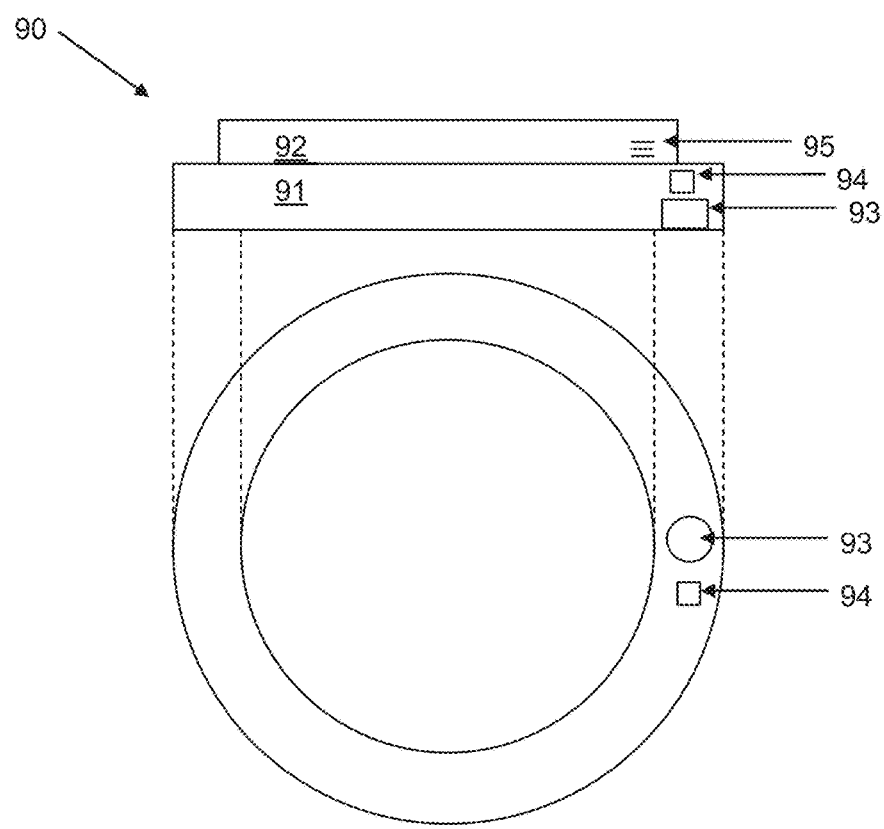
FIG. 9 shows a side and a front view of a bezel with a sensor set into the front of the bezel and electrical contacts and signal paths of the type shown in FIG. 6.

FIG. 9 shows a bezel 90 according to the present invention which comprises a fixing means 92 for removable attachment to a lamp portion of the types disclosed above. Bezel 90 includes a sensor 93 able to sense information about the local environment of luminaire 100,2,3 to which the bezel can be removably attached and detached. In FIG. 9, only one sensor is shown for the sake of simplicity, but multiple sensors can be similarly incorporated into the outward facing outer ring of the bezel. The bezel also includes electrical contact means 95, shown here as a series of contacts in a group. When fitted to a luminaire electrical contact means 95 provides an electrical and signal connection between the bezel 90 and the lamp portion. Advantageously, electrical contact means 95 is cableless, that is to say there is no separate cable connection between the bezel portion and the lamp portion that requires separate connection in addition to the attachment of the bezel portion. As disclosed above, for a cableless connection, one or more electrical/signal contact points 95 on bezel 90 are brought into contact with corresponding electrical/signal contact points on luminaire 2,3 as the bezel 90 is pushed onto, screwed into, or twist-locked onto the luminaire. In FIG. 5, these electrical/signal contacts are formed by the two sets being pushed together under pressure as bezel 3B is fitted to lamp portion 3A, in an analogous way as, for example, the contacts on a print head of a printer engage with the contacts 50 on a surface 62 of a print cartridge 60 of the type shown in FIG. 6 as the cartridge is fitted. FIG. 6 also shows how signals from the print head are conveyed to the print cartridge via contact paths 58. The bezel 90 further comprises a processor 94 for analysing a signal received from the sensor 93 and for providing data about an environmental characteristic, processor 94 receiving electrical power from the luminaire via the electrical contact means 95.

Sensor technology is advancing rapidly and there is an increasing drive to design smaller and smaller sensors, and also sensors capable of measuring multiple environmental conditions. This miniaturisation provides new possibilities for the location of a sensor arrangement in a luminaire, and for communication to and from the sensor. One such example is shown in FIG. 10.

FIG. 10A illustrates a front view of a luminaire bezel 225 according to a further embodiment of the present. This bezel is designed to attach to a lamp portion of a luminaire using any of the methods described above or similar. The attachment means is not shown for the sake of clarity. The centre of the bezel consists of a glass disk 226, although other substantially transparent materials can be used instead of glass, such as polycarbonates e.g. BPA. The outside perimeter of the glass disk 226 includes a frosted annular ring 227. There is a small, substantially transparent window or gap 228 in the frosting, adapted to accommodate a sensor 242. The sensor is preferably on the inside of the glass and protected by it. In this example an active pixel sensor measuring approximately 3 mm by 3 mm overall PCB size or slightly larger is being used. This fits within the window or gap 228 provided. It will be appreciated that any suitable type or types of sensor can be used, as determined by the appropriate specialist, and as required according to the environmental parameter(s) that need to be measured or detected.

Power for the sensor is provided by Radio Frequency Identification (RFID), Near Field Communication (NFC), BLE or other suitable wireless technologies and protocols. These may require an antenna 229 which is located on and around the inside perimeter of the bezel 230, as shown in FIG. 10B. This arrangement conveniently allows for multiple loops of the aerial, which connects a suitable transmitter/radio chip (not shown) and thus to a sensor 242. In this example the antenna uses RFID induction to produce in the region of 1-2 mA to power the sensor/transmitter combination. The antenna is capable of picking up a magnetic field emitted from a first antenna in the lamp portion of the luminaire and converting this magnetic field into a small current to power the sensor arrangement and associated radio chip for transmitting data from the sensor arrangement. The antenna could be embedded within the glass or printed on the glass surface and circle around the outer perimeter of the disk in multiple loops. The antenna for the radio chip can alternatively be printed on an inner surface of the bezel itself. Such antennas can be produced, for example, by screen-printing, inkjet printing, or liquid metal-filled microfluidics in simple motifs, such as dipoles and loops. Other printing approaches may be used, for example, omnidirectional printing based on aerosol jet technology, which is a digital process that can print conformal antennas using conductive nanoparticle silver inks. The printing process accurately controls the location, geometry and thickness of the deposit and produces a smooth mirror-like surface finish to insure optimum antenna performance (Optomec, Albuquerque, N. Mex.). The process works with standard injection moulded plastics, and no special additives or coatings are required.

FIG. 10C shows a diagrammatic cross-sectional side view of the bezel 225. This shows the sensor 242 located behind the edge of the glass disk. It also shows a convex lens 230 formed within the glass in order to spread the sensor detection angle.

FIG. 10D shows in diagrammatic form how an active pixel sensor may be split into different sectors, in this example the filter over the active pixel sensor is split into four substantially equal quadrants. Each quadrant or sector can filter a different wavelength of light, such that a UV filter can be used to sense daylight where as an IR filter can be used to detect movement of a warm body such as a human being. Other filters can be used as determined by the materials specialist.

The foregoing explains the application of the invention principally to downlights and the like, but it is to be understood that other shapes of luminaire 100 will be obvious to the skilled person, including spherical, elliptical, polygonal, or linear. Panel lights, for example, are typically quadrilateral in shape, having a range of sizes, for example 1200×1200 mm, 600×600 mm and 300×300 mm. Panels have a bezel, typically 5 mm, and the antenna (for example antenna 229 of FIG. 10A) may be located in the corner of the panel, on the bezel, on the bezel surround, or on diffuser of the panel luminaire. The antenna can be embedded within the diffuser or printed on the diffuser surface and circle around the outer perimeter of the diffuser. The antenna for the radio chip can alternatively be printed on an inner surface of the bezel itself. Similar approaches can be employed with linear luminaires such as lighting tubes.

It will be appreciated that with the various types of wireless communication envisaged being used in this invention, there will be a radio chip associated with the sensor arrangement, wherever that sensor arrangement is located. An example of this radio chip arrangement is shown in FIG. 11B. A corresponding radio chip or receiver is located in the luminaire in any suitable location. This could, for example, be on an LED MCPCB or on a separate PCB located elsewhere in the luminaire, provided it is within the recommended scan distance from the antenna and transmitter associated with the sensor arrangement with which it is designed to communicate.

This arrangement, and the other arrangements shown in FIGS. 11 to 14, offer the advantage that there is now no longer a requirement for a direct electrical connection between the bezel portion which includes the sensor arrangement and the lamp portion of the luminaire containing the first antenna and the receiver. This means that a sealing ring (not shown), such as a silicone rubber or neoprene rubber flat washer or seal, can be inserted between the bezel and the lamp portion. This, together with other constructional arrangements in the lamp portion, ensures that the necessary IP rating can be achieved.

FIG. 11 shows an alternative bezel arrangement in which the antenna is located in the glass disk. A glass disk 326 is located in the centre of a bezel surround 325. In this example the antenna 329 is embedded in the frosted perimeter of the glass disk. As in the previous example, NFC, RFID, BLE, or any suitable wireless communication protocol requiring an antenna, or where performance can be improved through use of an antenna, can be employed. A terminal point 340 is provided for connecting the antenna to a radio chip and sensor/sensor array. The frosted finish, while not essential, helps to hide any visibility of the antenna from plain view. The antenna could be embedded within the glass or printed on the glass surface (for example, as described above) and circle around the outer perimeter of the disk in multiple loops.

The sensor and associated transmitter radio chip can be located in any suitable locations, such as on the outside of the bezel or inside or outside of the glass disk as described above, with or without a convex lens arrangement.
the diffuser surface and circle around the outer perimeter of the diffuser. The antenna for the radio chip can alternatively be printed on an inner surface of the bezel itself. Similar approaches can be employed with linear luminaires such as lighting tubes.

It will be appreciated that with the various types of wireless communication envisaged being used in this invention, there will be a radio chip associated with the sensor arrangement, wherever that sensor arrangement is located. An example of this radio chip arrangement is shown in FIG. 11B. A corresponding radio chip or receiver is located in the luminaire in any suitable location. This could, for example, be on an LED MCPCB or on a separate PCB located elsewhere in the luminaire, provided it is within the recommended scan distance from the antenna and transmitter associated with the sensor arrangement with which it is designed to communicate.

This arrangement, and the other arrangements shown in FIGS. 11 to 14, offer the advantage that there is now no longer a requirement for a direct electrical connection between the bezel portion which includes the sensor arrangement and the lamp portion of the luminaire containing the first antenna and the receiver. This means that a sealing ring (not shown), such as a silicone rubber or neoprene rubber flat washer or seal, can be inserted between the bezel and the lamp portion. This, together with other constructional arrangements in the lamp portion, ensures that the necessary IP rating can be achieved.

FIG. 11 shows an alternative bezel arrangement in which the antenna is located in the glass disk. A glass disk 326 is located in the centre of a bezel surround 325. In this example the antenna 329 is embedded in the frosted perimeter of the glass disk. As in the previous example, NFC, RFID, BLE, or any suitable wireless communication protocol requiring an antenna, or where performance can be improved through use of an antenna, can be employed. A terminal point 340 is provided for connecting the antenna to a radio chip and sensor/sensor array. The frosted finish, while not essential, helps to hide any visibility of the antenna from plain view. The antenna could be embedded within the glass or printed on the glass surface (for example, as described above) and circle around the outer perimeter of the disk in multiple loops.

The sensor and associated transmitter radio chip can be located in any suitable locations, such as on the outside of the bezel or inside or outside of the glass disk as described above, with or without a convex lens arrangement.

Figure 16:
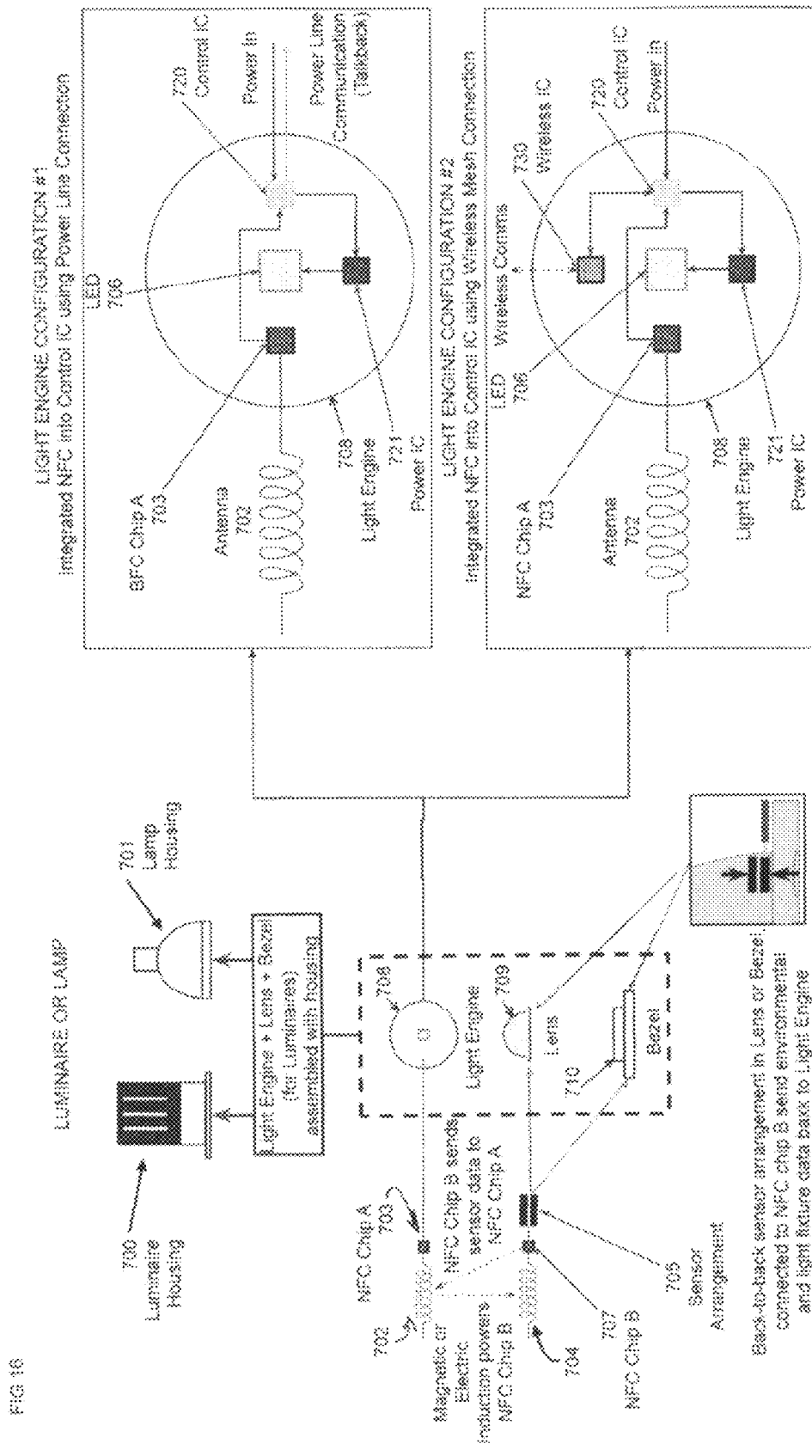
FIG. 16 shows schematically the location of the two radio chips and two possible light engine configurations for handling data from the sensors.
Figure 17:
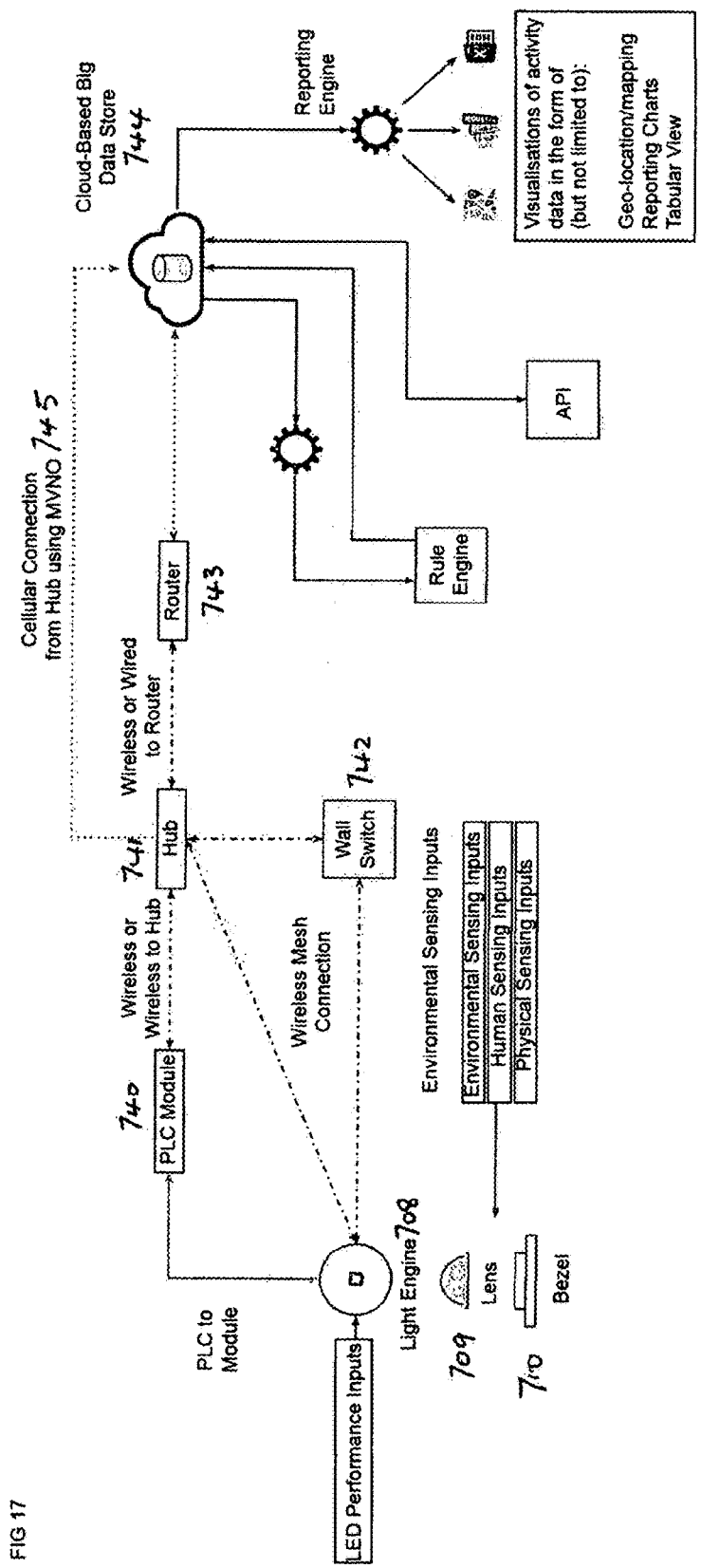
FIG. 17 shows schematically how data may be transmitted to and from the cloud from luminaire components according to the present invention.

It will be understood that the data collected by the sensor(s) must be stored and processed. This can be done at a number of locations. These include, but are not limited to, within the luminaire by including the necessary processing function within the luminaire, remotely in a hub, or in the so-called 'cloud'. Data can be transmitted from the luminaire to the required destination(s) using a wide variety of known techniques and protocols such as PLC, Wi-Fi, Bluetooth, ZigBee, DALI or the like, as described in the examples above and as shown in FIGS. 16 and 17 described below.

One of the preferred protocols is low energy Bluetooth. CSR Plc has recently developed a mesh protocol that uses Bluetooth Smart to send messages to other Bluetooth Smart devices in a network which in turn send them onward. Messages can be addressed to individual devices or groups of devices. It is also possible for devices to belong to more than one group. Control is enabled via standard Bluetooth Smart enabled appliances such as light switches, or via the majority of Smartphone or tablets available today. It is intended to adopt this or other similar meshing technologies by incorporating the necessary Bluetooth components/chip in each luminaire, in order that luminaires may communicate with each other wirelessly and transmit data to a remote hub, even if that hub is too far away from the most remote luminaire for data to be transmitted directly. This issue of communicating between devices over long distances can be a particular problem in large buildings such as office complexes, warehouses and manufacturing facilities.

Referring to FIG. 12, this illustrates an alternative location to the bezel for the sensor arrangement and its associated antenna/transmitter. FIG. 12A illustrates diagrammatically a type of lens used to focus light from an LED light engine. FIG. 12 refers to LEDCHROIC® lenses which are a particular design of solid lens being cup-shaped or substantially frustoconical and which have a high density of shaped facets around the outer curved surface of the lens (not shown). However, this technology is not limited to use on LEDCHROIC® lenses and can be applied to virtually any type of lens. The LED sits in a cavity 402 (not shown) in the narrow or top part of the lens in the orientation as shown in FIG. 12A, and light from the LED is focussed by facets by total internal reflection to give the desired beam angle and is emitted from the widest end of the lens which includes a flange. The lens, which can be made from glass or a suitable plastics material, has an outwardly extending flange 401 around its widest, light emitting end and this flange provides a suitable location for both the antenna 429 and the sensor/chip arrangement 442.

Thus the antenna can be embedded in the flange or located on a surface of the flange and circle around the outer perimeter of the lens flange similar to the arrangement described above. The antenna for the radio chip can alternatively be printed on an inner surface of the flange itself as described above. The flange may be frosted and the frosted finish, while not essential, can hide any visibility of the antenna from plain view. A terminal point 440 is provided for connection to a radio chip and sensor array.

As in the previous example, NFC, RFID, BLE or any wireless communication protocol requiring an antenna, or where performance can be improved through use of an antenna can be employed.

As in earlier examples, the sensor array/radio chip can be mounted in any suitable location. In this example the radio chip is mounted on the top side of the outer rim or flange or embedded within the lens and is directed away from the lens and hence away from the luminaire in order to sense features of the environment below/beneath the luminaire, such as ambient light, movement and the like.

FIGS. 13 and 14 illustrate other applications for the present invention. FIG. 13 shows schematically an integrated downlight or a track light where the same NFC, RFID, BLE or other suitable wireless communication protocol is employed. The sensor arrangement may be located on the bezel, as described above, directly on the LED light engine, on a daughter board located alongside or above the LED light engine, or as a modular device within or outside the luminaire housing. These are shown as options 542(a) to (d). Once again the recommended scan distance from the radio chip associated with the sensor arrangement with which it is designed to communicate must be born in mind when locating the respective radio chips.

FIG. 14 shows how this technology can be applied to a lamp or bulb, in particular an LED lamp or bulb. A wide variety of lamps are now available with a wide variety of lamp holder fittings. However these bulbs tend to have common features such as a lens of some sort covering the front of the lamp and an LED light engine. These provide useful locations for the sensor arrangement as shown as 642(a) and 642(b) in FIG. 14. The sensor could also be located on a daughter board as shown as 642(c). All of these locations face towards the front of the lamp and thus can detect the environment in front of the lamp.

These lamps/bulbs can be installed into a wide variety of locations such as a ceiling downlight can, or a floor standing desk lamp. This technology is therefore applicable to a wide variety of lamps including MR16, GU10, PAR20, PAR30, PAR38, AR111, GLS and LED tubes. It will therefore be appreciated that in the context of the present invention the term 'luminaire' has a very broad meaning and extends to include lamps or bulbs that fit into a lighting fixture.

RFID and NFC are two closely related wireless communication technologies that are used globally for a vast number of applications. RFID, which was the precursor to NFC, enables one way wireless communication, typically between an unpowered RFID tag and a powered RFID reader. RFID operates at a range of radio frequencies, each with their own set standards and protocols.

NFC operates at 13.56 MHz and is capable of two way communication but is limited to close proximity, typically 5 cm or less. However, since the various luminaire components such as transmitters and receivers necessary to make this technology work in a luminaire situation are all located in or on a luminaire or lamp, this range limitation does not present a problem for the applications described.

As will be appreciated, both RFID and NFC tags require a powered transmitter and receiver in order to provide electrical power to a so-called tag and to receive information or data back from the tag. So in practice a first antenna is located in the luminaire, within approximately 5 centimeters of the tag and its associated antenna. This transmitter provides power to the tag wirelessly. A second antenna is located on or associated with the tag and converts the signal from the first antenna into electrical power. A transmitter is associated with the tag/sensor arrangement and sends data back to a receiver in the luminaire. The first antenna and the receiver or reader, both preferably located in the luminaire, may be combined into a transceiver or radio chip. The transmitter and second antenna, both located on or associated with the sensor array, may also be combined into a single radio chip. The data gathered by the receiver or reader in the luminaire is passed to a processor that processes the data locally or transmits it to a hub, again using a suitable wireless protocol or suitable power line communication protocol, and then into the cloud, if required, for storage and further processing as necessary, see below.

Reference was made above to the miniaturisation of sensors and radio chips. In an example of this, it has been reported recently (PC World, 11 Sep. 2014) that a Stanford engineering team has built a radio, equipped with sensors, computational units and antennas just one-tenth the size of Wi-Fi antennas, that is able to gain all the power it needs from the same electromagnetic waves that carry signals to its receiving antenna. It is said to operate in the 24 GHz and 60 GHZ bands, suitable for communication over a few tens of centimeters. The radio is built on a single piece of silicon measuring just 3.7×1.2 mm including the antenna, and the engineers envisage that one day trillions of objects will be connected to the internet by these tiny radios. It will be appreciated that the present invention will make use of such miniature radios as they become commercially available, allowing separate antenna to be dispensed with.

Referring now to FIG. 15, this shows a further example of a sensor arrangement associated with a lens of a similar type to that shown in FIG. 12. FIG. 15A illustrates diagrammatically a lens 500, which can be made from glass or a suitable plastics material, having an outwardly extending flange 501 around its widest, light emitting end which flange provides a suitable location for antenna 529, which in this example is arranged on a luminaire-facing side of flange 501. FIG. 15B illustrates diagrammatically a magnified portion of FIG. 15A containing the sensor arrangement 562, 552 and 554 and shows the antenna 529 embedded in the flange 501. In an alternative arrangement radio chip 562 and capacitor 543 may be embedded within the lens (not shown). Typically, the NFC chip is of the order of 3 mm×3 mm.

FIG. 15B also shows two sensors 552 and 554 in a back-to-back arrangement. One of these sensors 552 is downward facing, that is to say it faces away from the luminaire and the light source and into the environment below the luminaire, and is designed for sensing information about the environment beneath the luminaire such as ambient light and occupancy as described above. It is located above a convex lens 530 formed within the glass in order to spread the sensor detection angle. Sensor 552 is typically an optical sensor, with filter layer, capable of reading motion, ambient daylight and light colour, for example. In contrast, sensor 554 faces upwards, that is it faces toward the LED light source, and is able to measure features of the light coming directly from LED chip, such as lumen output, colour temperature and Colour Rendering Index (CRI) sometimes called Colour Retention Index. In this way the performance of each luminaire can be monitored over time and compared with a standard, as well as with the individual performance of that luminaire from the time of its first operation.

It will be understood that the two sensors 552, 554 need not be in a back-to-back configuration but can be space and positioned appropriately in order to achieve optimum performance. Also the number of sensors need not be limited to two. Depending on the criteria to be measured, and the type(s) of sensors required to do this, any number of individual sensors can be used.

Having a sensor array that faces toward the LED light source provides a particularly important functionality where the lumen output or colour temperature of the luminaire is critical. This could for example be in a retail environment where product lighting is critical. Thus the individual status of each luminaire in a chosen group of luminaires which have these backwards facing sensors can be reported on a real time basis. If the performance of one or more luminaires falls below a set threshold, or fails completely, a warning can be given that a particular lamp needs to be changed, specifying exactly which lamp is faulty. This avoids the need for regular inspections of the luminaires and for the requirement to take detailed measurements of lumen output, colour temperature or CRI of each lamp in a grouping.

It may be possible, based on the individual information from a backwards facing sensor in a particular luminaire, that the control IC in a particular LED light engine can "overdrive" that LED, thus increasing its light output. This will of course be at the expense of the lifetime of that LED, which will be reduced as a consequence.

This new functionality has a further important application. LED luminaires have a predicted lifetime. However, this is usually a prediction of the average time to complete failure, or to a certain percentage level of performance, but to date this has not been based on factual measurements of luminaires operating in a particular or specific working environment. Using data collected from these backwards facing sensors actual data can be collected on the life of LED light engines operating in a particular working environment, and this can be used to provide much more accurate predicted lifetimes.

Typically as in the previous example the sensors are of the order of 3 mm×3 mm, and are preferably active pixel sensor chips. Sensors 552 and 554 are shown as being separate devices, but these may be integrated into a single device having both an upward facing sensor and a downward facing sensor. Furthermore, only one radio chip is required to report back data from both sensors, and sensors 552 and 554 and radio chip 562 may be integrated into a single device.

FIG. 15C shows a schematic top plan view of lens 500, and includes a frosted perimeter 502 having an antenna 529 located in or on this outer region of the lens. Antenna 529 can be printed or placed here, for example within a clear sticker. Radio chip 562 and the stack of the sensor chips 552, 554 are also shown. Optionally a capacitor 543, preferably mounted on the luminaire-facing side of flange 501, may be provided to stabilise the current provided by the antenna 529 to the sensors 552, 554 and NFC radio chip 562.

In summary, a feature of the dual sensor arrangement is that not only is it possible to obtain information about the environment below or around the luminaire, but it also possible to monitor characteristics of the lamp itself, for example, the intensity of the light output of the luminaire. In particular, it is now possible to measure the luminous flux of the lamp and the quality of the light output, for example the colour temperature of the output.

An advantage of this is that the intensity of the light output of the LED light engine can be controlled over its useful life by adjusting the current/voltage supplied to the LED within the lamp. In addition, the colour temperature can be maintained within a certain range. For example, if the lamp comprises two (or more) LED's of differing colour temperature, the intensity of each can be adjusted so as to give a substantially constant required colour temperature output.

FIG. 16 illustrates in schematic diagrammatic form possible sensor arrangement locations and two possible configurations of the associated components on an LED light engine PCB. A luminaire housing, in this example a downlight housing 700 is used as a typical luminaire and lamp housing 701 is used as a typical lamp or bulb. Where these are LED luminaires they will include an LED light engine and a lens. In the case of a downlight, this will include a bezel also. Thus a first antenna 702 and NFC Chip A 703 are incorporated onto the LED light engine 708. A second antenna 704, NFC Chip B 707 and sensor arrangement 705 are incorporated into a lens 709 or a bezel 710 as described above, or into any other suitable portion of a luminaire. Communication between the various components is as described above.

The right hand side of FIG. 16 shows possible arrangements for components on the LED light engine 708. Configuration #1 shows antenna 702 attached to NFC Chip A 703 which in turn is connected a Control IC 720. Chip A 703 can send data signals to the Control IC 720 and receives power from the Control IC by way of a power IC 721. Powerline communication, with talkback, to and from the Control IC enables data received by NFC Chip A to be exported from the light engine 708 and thus from the luminaire and control and other signals to be transmitted back to the luminaire as required.

Configuration #2 shows a similar arrangement, but one which includes a wireless communications chip 730, as an alternative to powerline communication, for transmitting data and other signals to and from the LED light engine 708. Thus data from the sensor arrangement 705 is relayed to the Control IC 720 and then to the wireless IC 730 for onward storage and processing as required, before being sent back to the Control IC by a similar route.

FIG. 17 shows schematically how data exported from the LED light engine, whether by powerline communication or by wireless connection, using meshing as necessary, may be transmitted from a hub 741 via a router 743 to a cloud-based system. Since luminaires are usually close to a light switch 742, communication from the light engine could start by wireless or powerline transmission to a light switch having the desired functionality to receive such communications and to transmit them onwards to hub 741. A router is not an essential component in the system, as the hub could communicate directly with the cloud using a Mobile Virtual Network Operator and a cellular connection 745.

Further embodiments of the present invention are illustrated in FIGS. 18, 19 and 20. Referring to FIG. 18, this shows an exploded, diagrammatic view of an LED light engine module 806 mounted on a PCB 808, a so-called collar 813 and a lens 800. The arrangement of an LED module with various components mounted on a printed circuit board is found in many conventional downlights, lamps and other types of luminaires. Light from the LED module is collected and focused by an optical system, in this example lens 800, which in this example is a solid plastic lens that focuses light by total internal reflection by way of multiple facets on its external surface where reflection takes place. Such lenses typically have a flange 801 by which the lens can be mounted in the downlight, in this example using collar 813. However, it will be understood that there are many other ways of mounting a lens or other optical system over an LED or array of LEDs, depending on the size, shape and configuration of the luminaire.

The collar in this embodiment has additional functionality over known collars. For example, it incorporates its own, second, PCB. The collar in this example is substantially tubular or cylindrical in shape, having a substantially circular cylindrical cross-section. It has a front edge face 814, facing away from the light module, and a back edge face 815 which faces towards and abuts the LED light module PCB. The side of the substantially tubular collar has an outer surface 816 and an inner surface 817.

The term 'collar' has a very broad meaning in the context of this invention. It may be a continuous shape, as in this example, or be discontinuous. Its shape and configuration will be determined in part by the space that it can occupy in a particular luminaire and it will therefore be understood that the 'collar' can be any desired shape to fit in the space available. For example in the case of a linear LED array, equivalent to a fluorescent strip light, the 'collar' may be substantially linear in configuration. It will also be appreciated that the second PCB need not be located on a collar at all, although the collar 813 is a convenient location for the second PCB in this particular example, which describes a luminaire component particularly suited to incorporate into a downlight.

The PCB on the collar can be located on the inner 817 or the outer 816 surface and could take the form of a thin film, flexible PCB adhered to a surface of the collar. It is now possible to create a PCB by a printing process (Xerox Research Centre of Canada 2660 Speakman Drive Mississauga, Ontario L5K 2L1 Canada) and by using this type of printing process it would be possible to print a PCB onto any suitable substrate.

Alternatively the second PCB could be a more rigid PCB, shaped to conform to a surface of the collar or other suitable surface. In a further alternative the collar itself could be formed from a suitable PCB material, such as glass-reinforced epoxy laminate sheet e.g. FR-4, formed into a suitable shape, such that the collar itself is a PCB.

It is important that the second PCB extends in a direction away from the LED PCB, and preferably in the general direction that light is emitted by the LED light engine. This effectively distances the components on or associated with the second PCB away from the LED itself, such that those components are disposed away for any interference created by the LED module.

In any of the above alternatives additional electronic components such as control circuitry, including integrated circuits (IC), can now be located on this second PCB on or associated with the collar. These components include, but are not limited to, driver components, power management and power conversion components, control components including a dimming function, sensor arrangements, communication chips and one or more antennas.

The PCB on the collar is connected to the light module PCB by some type of connection means. This connection means provides power and/or data communication between the two PCBs. This connection means could take a variety of forms, such as male and female pin connectors 852, 851 as shown in FIG. 18, or one or more electrical contact points on the respective PCBs that are brought into contact when the collar is attached to the light module PCB, perhaps by way of a twist and lock fixing mechanism. This type of connection means is described in more detail in relation to FIG. 6 above.

The collar 813 also provides a good location for an antenna 802 which can provide power to one or more sensors 805 located in or on the lens 800 or in or on a bezel, as described above. Where wireless communication is used to transmit data collected by the sensors 805, there will also be a requirement for a communications chip (see above) and/or a further antenna 804 located in a suitable position.

FIG. 19 shows the components of FIG. 18 in an assembled state, including sensors 862 and 863 located in the flange of the lens. The various sensor types that can be employed are described above.

Referring to FIG. 20, this illustrates a further embodiment in which sensors are located on a front forward-facing edge of the collar/PCB. A similar numbering system has been used in FIG. 20 to that in FIG. 18, where appropriate. The collar 903 includes a second PCB and connectors 951, 952 to connect it to the LED module PCB 908 as described above.

In this example sensor arrangements or sensor arrays 962 are located on a front edge face 914 of the collar, facing in the direction in which light is being projected. These sensors align with the flange 901 of lens 900 and aperture(s) or light pipe(s) 920 in the lens flange allows for the sensors mounted on the collar to be exposed and capture sensor input data. The light pipe(s) may have additional lenses facing outwards to allow for different beam angles of data capture. As in previous embodiments, a very wide type and number of sensors and sensor array can be incorporated into this type of arrangement, as described above.

Additional sensor(s) 963 may be directed towards the side of the lens to measure features of the light emitted by the LED chip such as lumen output, colour temperature and Colour Rendering Index (CRI).

An antenna 902 is also shown in FIG. 20. Depending on how data is transmitted from or collected by the luminaire component, this antenna may or may not be required. Data can be transmitted from the luminaire component using Power Line Communication (PLC) or any of the wireless protocols described above. However, it is also envisaged that a hard-wired data connection could be provided from the luminaire component to a communications unit located in a remote location, such as part of a plug-in type two part electrical connector block. Such connector blocks are well known in the electrical trade and lighting industry and a wide variety are already commercially available. These could be modified to introduce or include a communications function. Examples of types of connector that have particular application in the lighting sector are the Aurora Limited FASTFIX® Rapid Install System, the Scolmore International Limited CLICK® system, and GST18i connectors. In this situation, an antenna as part of the luminaire component may not be required.

In summary, the embodiments described above provide a modular collar for an LED Light Module, operating at either mains voltage or low voltage, where the collar contains one or more of the following components:—ICs, Sensors, Discrete Components, Passive Components or Antennas.

This arrangement extends the functionality of the LED Light Engine to increase or improve two-way communication, improve wireless communication range and house pairing components or pass through communication for external sensory items. Key benefits offered by this novel arrangement include:—

1) Due to the size of the LED Light Module on its PCB, there is limited space available on that PCB for additional components. A second PCB that connects to the main PCB board provides additional PCB surface area for additional components.

2) An antenna needed for wireless communication may need to be separated from the LED Light Engine due to interference, and shrouding by any metal structure of the luminaire, and moving the antenna away from the Light Engine improves the reception performance.

3) The cost and functionality of the complete solution has much improved granularity, such that a single version of the LED Light Engine can be produced, where (a) communications, (b) sensors, and (c) antennas, and/or (d) other functionality can be added as an optional layer on top of one base LED Light Engine.

It is envisaged that this type of collar would replace the existing type of lens holder that sits on an LED Light Engine, providing additional functionality as well as keeping the lens in place.

Added benefits of a collar arrangement of the type described above include:—

4) The offset of a communication device (a) from the LED Light Engine allows reduced proximity of sensory items (b) located on the front of a light fitting to the antenna/s (c), enabling RF Induction powering of the sensory devices;

5) The addition of wireless network communication device (a. and/or c.), that may or may not be mesh-networking enabled, on the collar allows the two way communication to be both local and cloud communicable;

6) The collar can further be used as a twist and lock, clip in or fixed mount for the LED Light engines optical system that can carry the sensors (b).

The invention claimed is:

1. A luminaire component for use in a luminaire, said component comprising:
 (i) an LED module on a first printed circuit board (PCB), the first PCB having a front face on which the LED module is located;
 (ii) a second PCB mounted forward of the front face of the first PCB and incorporating one or more data communication devices;
 (iii) connection means adapted to connect the second PCB to the first PCB; and
 (iv) a sensor arrangement incorporating one or more sensors;
 further comprising a transmitter suitable for transmitting data obtained by the sensor arrangement.

2. The luminaire component of claim 1, wherein the data communication device comprises a wireless communication device.

3. The luminaire component of claim 1, further comprising a lens for focusing light emitted by the LED module.

4. The luminaire component of claim 1, further comprising one or more antennae.

5. The luminaire component of claim 3, wherein the sensor arrangement is located on or associated with the lens.

6. The luminaire component of claim 5, wherein the lens incorporates an outwardly extending flange and the sensor arrangement is located in or on that flange.

7. The luminaire component of claim 1, further comprising a collar.

8. The luminaire component of claim 7, wherein the collar is non-circular in its configuration.

9. The luminaire component of claim 7, wherein the collar supports the second PCB.

10. The luminaire component of claim 7 wherein the sensor arrangement is located on or associated with the collar.

11. The luminaire component of claim 10 wherein the sensor arrangement is located on or associated with an outer edge of the collar, furthest from the LED module.

12. The luminaire component of claim 10, wherein the collar further comprises a transmitter assembly suitable for transmitting data obtained by the sensor arrangement.

13. The luminaire component of claim 1, further comprising a second connection means adapted to connect the sensor arrangement to the second PCB.

14. The luminaire component of claim 7, further comprising a lens for focusing light emitted by the LED module, wherein the collar supports the lens.

15. The luminaire component of claim 7, further comprising one or more antennae, wherein the antenna is located on or associated with the collar.

16. The luminaire component of claim 7, wherein one antenna comprises a first antenna suitable for creating a magnetic or electrical field suitable for powering the sensor arrangement.

17. The luminaire component of claim 16, wherein one antenna comprises a second antenna suitable for converting the magnetic or electrical field from the first antenna into electrical power for powering the sensor arrangement.

18. The luminaire component of claim 17, wherein the second antenna is located on or associated with the lens flange.

19. The luminaire component of claim 1, wherein the second PCB comprises a flexible PCB.

20. The luminaire component of claim 19, wherein the second PCB comprises an adhesive flexible PCB.

21. The luminaire component of claim 1, wherein the connection means provides a power connection between the first PCB and the second PCB.

22. The luminaire component of claim 1, wherein the connection means provides data connection(s) between the first PCB and the second PCB.

23. The luminaire component of claim 1, wherein the connection means is selected from the group consisting of: a plurality of male and female pin connectors and one or more electrical contact points on or associated with the second PCB which are brought into contact with corresponding electrical contact points on the first PBC.

24. The luminaire component of claim 1, further comprising a receiver suitable for receiving data from the sensor arrangement.

25. The luminaire incorporating a luminaire component of claim 1.

* * * * *